United States Patent
Baek et al.

(10) Patent No.: US 10,530,537 B2
(45) Date of Patent: Jan. 7, 2020

(54) METHOD AND APPARATUS FOR RETRANSMISSION IN COMMUNICATION SYSTEM

(71) Applicant: Samsung Electronics Co., Ltd., Suwon-si, Gyeonggi-do (KR)

(72) Inventors: Sangkyu Baek, Yongin-si (KR); Anil Agiwal, Suwon-si (KR); Youngbin Chang, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 35 days.

(21) Appl. No.: 15/862,183

(22) Filed: Jan. 4, 2018

(65) Prior Publication Data
US 2018/0191479 A1  Jul. 5, 2018

(30) Foreign Application Priority Data
Jan. 4, 2017 (KR) .................... 10-2017-0001489

(51) Int. Cl.
*H04L 1/18* (2006.01)
*H04L 5/00* (2006.01)
*H04W 72/04* (2009.01)
*H04L 1/16* (2006.01)

(52) U.S. Cl.
CPC .......... *H04L 1/1851* (2013.01); *H04L 1/1614* (2013.01); *H04L 1/1841* (2013.01); *H04L 1/1848* (2013.01); *H04L 1/1867* (2013.01); *H04L 5/0055* (2013.01); *H04W 72/0406* (2013.01); *H04L 1/1812* (2013.01)

(58) Field of Classification Search
CPC .... H04L 1/1851; H04L 1/1841; H04L 1/1848
See application file for complete search history.

(56) References Cited

U.S. PATENT DOCUMENTS

| | | | | |
|---|---|---|---|---|
| 5,444,718 A | * | 8/1995 | Ejzak | H04L 1/1614 714/748 |
| 7,000,021 B1 | * | 2/2006 | Radhakrishnan | H04L 1/1614 370/394 |
| 8,904,245 B2 | * | 12/2014 | Tilwani | H04L 1/1848 714/55 |
| 9,838,901 B2 | | 12/2017 | Lee et al. | |
| 9,906,332 B2 | * | 2/2018 | Rawat | H04L 1/1848 |

(Continued)

FOREIGN PATENT DOCUMENTS

KR  10-2016-0073962 A  6/2016

OTHER PUBLICATIONS

Nokia et al., 'On usage of PDCP SN at RLC for NR', R2-167662, 3GPP TSG RAN WG2 Meeting #96, Reno, USA, Nov. 4, 2016.

*Primary Examiner* — Joseph D Torres
(74) *Attorney, Agent, or Firm* — Jefferson IP Law, LLP

(57) ABSTRACT

A pre-5th-Generation (5G) or 5G communication system to be provided for supporting higher data rates beyond 4th-generation (4G) communication system such as long term evolution (LTE) is provided. A method of a receiver is provided. The method includes receiving packets to which a single SN is allocated, starting a reordering timer if there is a non-received packet, and requesting a retransmission of the non-received packet among the packets transmitted from a transmitter based on a received record message, if the reordering timer expires.

8 Claims, 22 Drawing Sheets

(56) References Cited

U.S. PATENT DOCUMENTS

| | | | |
|---|---|---|---|
| 2003/0169741 A1* | 9/2003 | Torsner | H04L 1/1819 370/394 |
| 2004/0218532 A1* | 11/2004 | Khirman | H04L 29/06 370/235 |
| 2008/0010578 A1* | 1/2008 | Jiang | H04L 1/1848 714/748 |
| 2010/0118780 A1* | 5/2010 | Umesh | H04L 1/1848 370/328 |
| 2012/0082096 A1* | 4/2012 | Cave | H04L 1/1841 370/328 |
| 2015/0146607 A1* | 5/2015 | Abraham | H04L 1/1685 370/312 |
| 2015/0193282 A1* | 7/2015 | Blocksome | G06F 9/546 719/313 |
| 2015/0280866 A1* | 10/2015 | Patil | H04L 1/08 370/312 |
| 2015/0304071 A1* | 10/2015 | Koskinen | H04L 1/1838 370/331 |
| 2016/0142939 A1 | 5/2016 | Yi et al. | |
| 2016/0219458 A1 | 7/2016 | Kubota et al. | |
| 2016/0248554 A1 | 8/2016 | Uchino et al. | |
| 2016/0315868 A1 | 10/2016 | Zhang et al. | |

\* cited by examiner

FIG. 10A

| D/C | PDU Type | R | R | Last Transmitted SN |
|---|---|---|---|---|
| Last Transmitted SN (Cont.) | | | | |
| Last Transmitted SN (Cont.) | | | | |
| Bitmap | | | | |
| Bitmap | | | | |
| ... | | | | |
| Bitmap | | | | |

FIG. 10B

```
D/C: 0 (Control)
PDU Type: Gap Information
Lsat Transmitted SN : 5
Bitmap : 01010
(Transmitted: 1, 3, Not transmitted: 0, 2, 4)
```

METHOD AND APPARATUS FOR RETRANSMISSION IN COMMUNICATION SYSTEM

CROSS-REFERENCE TO RELATED APPLICATION(S)

This application claims the benefit under 35 U.S.C. § 119(a) of a Korean patent application filed on Jan. 4, 2017 in the Korean Intellectual Property Office and assigned Serial number 10-2017-0001489, the entire disclosure of which is hereby incorporated by reference.

TECHNICAL FIELD

The present disclosure relates to a communication system. More particularly, the present disclosure relates to a multilink retransmission method using a single sequence number (SN).

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. Meanwhile, the sequence number (SN) is allocated in each of the packet data convergence protocol (PDCP) layer and a radio link control (RLC) layer of the protocol stack according to the related art. Therefore, a SN for handover, security, or the like and a SN for retransmission are used separately according to a related art, such that the overhead of the header is increased as many as the increasing SN. Therefore, a method for performing a retransmission using one SN (hereinafter, single SN) to reduce an overhead is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for performing a retransmission using a single sequence number (SN).

Objects of the present disclosure are not limited to the above-mentioned objects. That is, other objects that are not mentioned may be obviously understood by those skilled in the art to which the present disclosure pertains from the following description.

In accordance with an aspect of the present disclosure, a method of a receiver is provided. The method includes receiving packets to which a single SN is allocated, starting a reordering timer if there is a non-received packet, and requesting a retransmission for the non-received packet among the packets transmitted from a transmitter based on a received record message, if the reordering timer expires.

In accordance with another aspect of the present disclosure, a method of a transmitter is provided. The method includes transmitting packets to which a single SN is allocated, transmitting a record message including information on the packets transmitted from the transmitter, and receiving a retransmission request of a packet not received by a receiver among the packets transmitted from the transmitter based on the record message.

In accordance with another aspect of the present disclosure, a transmitter is provided. The transmitter includes a transceiver, and at least one processor configured to receive packets to which a single SN is allocated, start a reordering timer if there is a non-received packet, and request a retransmission of the non-received packet among the packets transmitted from a transmitter based on a received record message, if the reordering timer expires.

In accordance with another aspect of the present disclosure, of a receiver is provided. The receiver includes a transceiver, and at least one processor configured to transmit packets to which a single SN is allocated, transmit a record message including information on the packets transmitted from the transmitter, and receive a retransmission request of a packet not received by a receiver among the packets transmitted from the transmitter based on the record message.

According to the present disclosure, it is possible to effectively perform the retransmission without increasing the delay time even when the single SN is used.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A and 10B are diagrams illustrating a form of a record message according to an embodiment of the present disclosure;

Throughout the drawings, like reference numerals will be understood to refer to like parts, components, and structures.

DETAILED DESCRIPTION

Figure 1:
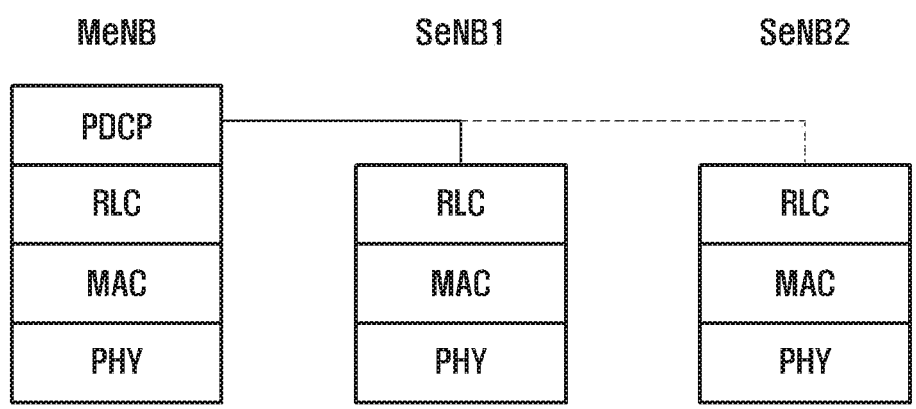
FIG. 1 is a diagram illustrating a protocol stack in a long term evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operations on the computer or the other programmable data processing apparatuses to create processes executed by the computer to thereby execute the computer or the other programmable data processing apparatuses may also provide operations for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are contiguously illustrated may be simultaneously performed in fact or be performed in a reverse sequence depending on corresponding functions sometimes.

Here, the term '-unit' used in the present embodiment means software or hardware components such as field-programmable gate arrays (FPGA) and application-specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more central processing units (CPUs) within a device or a security multimedia card.

Further, in the drawings illustrating a method in embodiments, the order of description does not necessarily correspond to the order of execution, and the order relationship may be changed or executed in parallel.

In addition, the present disclosure describes, by way of example, a case of a wireless communication system for convenience of explanation, but the content of the present disclosure may also be applied to a wired communication system.

FIG. 1 is a diagram illustrating a protocol stack in a long term evolution (LTE) system according to an embodiment of the present disclosure.

In dual connectivity of the LTE, a master cell group (MCG) bearer, a secondary cell group (SCG) bearer, and a split bearer may be supported. FIG. 1 illustrates a protocol stack in the split bearer.

Referring to FIG. 1, a wireless protocol of the LTE system may include a packet data convergence protocol (PDCP) layer, a radio link control (RLC) layer, a medium access control (MAC) layer, and a physical (PHY) layer in a terminal and a base station, respectively.

When the terminal makes dual connectivity with at least two base stations, the base station may transmit and receive data to and from the terminal through the split bearer. At this time, the PDCP layer may be located only in the base station (e.g., ~~~~ (MeNB) in the present disclosure) where the bearer is split, whereas the RLC layer may be located independently of links of each base station. In addition, in the LTE, the PDCP layer and the RLC layer may allocate the respective sequence numbers (SNs) to packets, and the RLC layer may independently perform a retransmission based on the allocated SN (RLC SN).

In addition, the terminal may include a protocol stack corresponding to a protocol stack of each base station. The concrete retransmission procedure will be described below.

Figure 2:
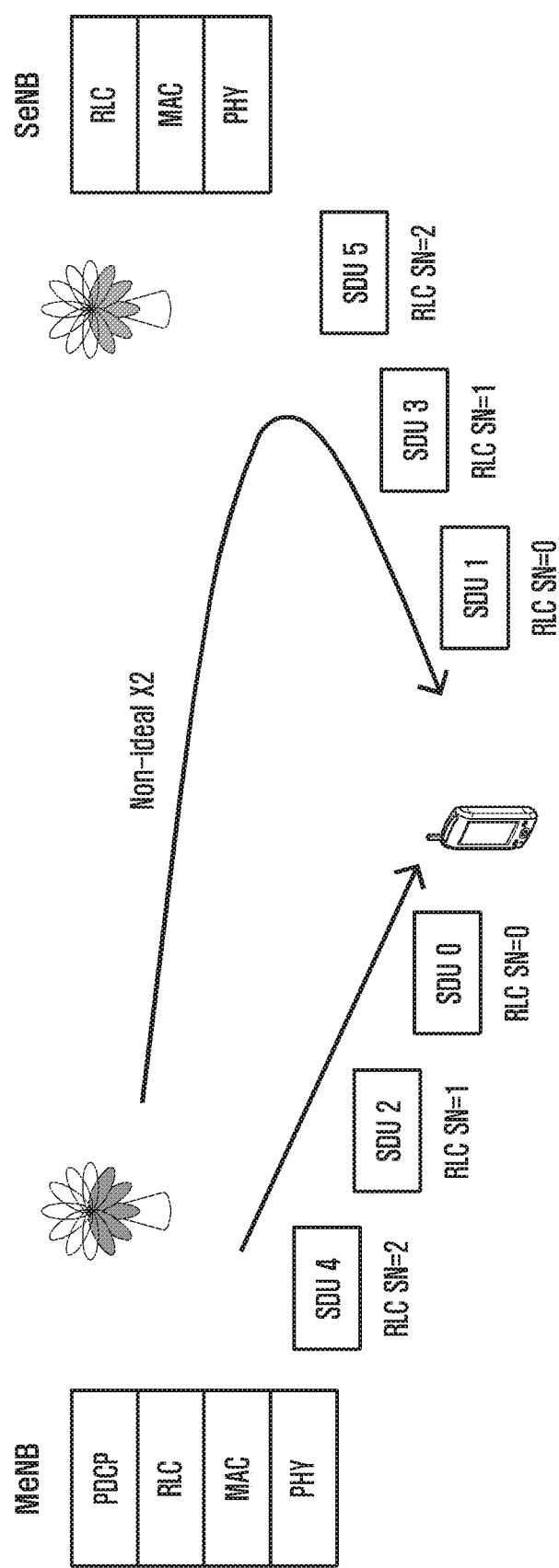
FIG. 2 is a diagram illustrating a retransmission process in the LTE system according to an embodiment of the present disclosure.

FIG. 2 is a diagram illustrating a retransmission process in the LTE system according to an embodiment of the present disclosure.

Referring to FIG. 2, when the MeNB receives a packet in the dual connection state, it is possible to directly transmit the packet to the terminal or transmit the packet to the terminal through the secondary eNB (SeNB).

In FIG. 2, numbers (service data units (SDUs) 1 to 6) allocated to the packets may refer to a SN (PDCP SN) of the packet allocated in the PDCP layer. That is, the base station may couple the PDCP SN with the packet in the PDCP layer.

Also, in the split bearer of the dual connectivity, a downlink packet (SDU or packet) may be combined with the RLC SN or the RLC SN may be allocated and transmitted.

At this time, the base station may add the SN to a header added to the packet in each layer. As described above, in the LTE system, the base station may add two SNs allocated in each layer to the packet, and the SN may be used for handover, security, retransmission, and the like.

Specifically, the reason why the base station couples two SNs with the packet is as follows.

In the example of FIG. 2, the MeNB may directly transmit packets Nos. 0, 2, and 4 (SDU 0, SDU 2, and SDU 4) through the link with the terminal.

In addition, when the terminal simultaneously access other base stations, the MeNB may transmit some packets to another base station (hereinafter referred to as SeNB), and the SeNB may transmit the packet to the terminal.

Accordingly, the SeNB may transmit packets Nos. 1, 3, and 5 (SDU1, SDU3, and SDU5) through the link with the terminal. At this time, since there is a non-ideal X2 interface between the MeNB and the SeNB, and packets Nos. 1, 3, and 5 (SDU 1, SDU 3, and SDU 5) are transmitted via the interface, a delay time may occur until the terminal arrives.

Also, since each RLC is independently operated in the link between the MeNB and the terminal and the link between the SeNB and the terminal, the terminal may not receive packets as SNs allocated in the PDCP layer. In addition, if the terminal does not receive some packets, it may not know whether the packet has not yet been arrived or has been lost due to a transmission delay caused by a non-ideal X2 interface with the SeNB.

Therefore, the RLC layer of the MeNB and the RLC layer of the SeNB may sequentially attach the RLC SN to the respective packets, and the MeNB and the SeNB may determine whether the packet is lost using the RLC SN, and independently perform the retransmission process.

Figure 3:
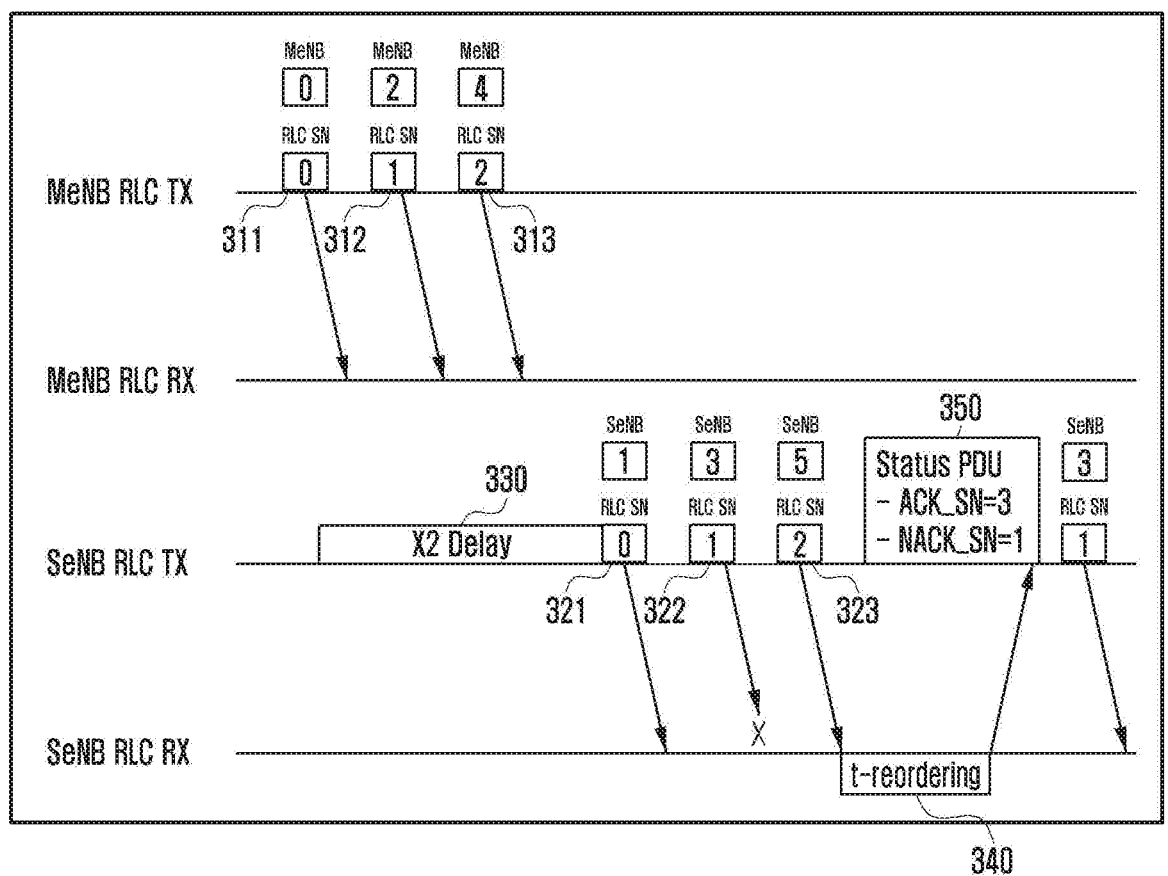
FIG. 3 is a diagram illustrating in detail the retransmission process in the LTE system according to an embodiment of the present disclosure.

FIG. 3 is a diagram illustrating in detail the retransmission process in the LTE system according to an embodiment of the present disclosure.

Referring to FIG. 3, RLC SN 0, 1, and 2 may be allocated to packets Nos. 0, 2, and 4 (SDU 0, SDU 2, and SDU 4) transmitted through the MeNB, and RLC SNs 0, 1, 2 may be allocated to packet Nos. 1, 3, and 5 (SDU 1, SDU 3, and SDU 5) transmitted through the SeNB, respectively.

Therefore, the terminal may identify non-received packets from each base station based on the RLC SN of the packet received through the link formed with each base station. Accordingly, the terminal may independently request the retransmission based on the RLC SN.

Specifically, the MeNB may sequentially transmit SDU 0 (RLC SN 0) 311, SDU 2 (RLC SN 1) 312, and SDU 4 (RLC SN 2) 313, and the terminal may sequentially receive the packets.

Specifically, the SeNB may sequentially transmit SDU 1 (RLC SN 0) 321, SDU 3 (RLC SN 1) 322, and SDU 5 (RLC SN 2) 323, and the terminal may sequentially receive the packets.

However, in the example of FIG. 3, the packet transmitted through the SeNB causes an X2 delay 330 generated through an X2 interface, and the terminal may receive the packet after the X2 delay.

In this case, if the SDU 3 (RLC SN 1) transmitted from the SeNB is lost, the terminal may identify that the packet corresponding to the RLC SN 1 has been lost after receiving the SDU 5 (RLC SN 2) and may operate a reordering timer 340. Herein after, the reordering timer can be referred as a t-reordering timer or timer. Then, after the reordering timer expires, the terminal may request the retransmission of the lost packet and receive the lost packet again.

Specifically, the terminal may transmit a status report (status protocol data unit (PDU)) message 350 to the SeNB, and may include the SN of the non-received packet in negative acknowledgement (NACK) information (NACK_SN) of the status report message. In the present embodiment, since the packet corresponding to the RLC SN 1 has not been received, the terminal may set the NACK_SN=1 and transmit the status report message to the base station.

In addition, a value obtained by adding 1 to the SN of the received packet may be included in ACK information (ACK_SN) of the status report message. In the present disclosure, since the terminal has received the packet of the RLC SN 2, it may set the ACK_SN=3 and transmit the status report message to the base station. At this time, the SN included in the ACK information may use the SN of the received packet after the lost packet.

Accordingly, the SeNB may identify that the terminal has not received the packet corresponding to the RLC SN 1 based on the status report message. Therefore, the SeNB may retransmit the SDU 3 which is a packet of the RLC SN 1, and the terminal may receive the SDU 3.

In addition, the terminal may reorder the packets after all the packets are received. When the packet corresponding to the RLC SN 1 is received, the terminal may reorder the packet using the RLC SN in the RLC layer and transmit the reordered packet. In addition, the terminal may perform the reordering using the PDCP SN in the PDCP layer and then retransmit the packet. However, the packet reordering in the RLC layer may be omitted.

On the other hand, in the present disclosure, the MeNB may be used in combination with the term first base station and the SeNB may be used in combination with the second base station. Further, in the present disclosure, for convenience of description, a downlink packet transmission in the case where a transmitter for transmitting a packet is a base station and a receiver for receiving a packet is a terminal will be described by way of example.

In addition, MeNB RLC TX used hereinafter may refer to the RLC layer of the transmitter corresponding to MeNB, and MeNB RLC RX may refer to the RLC layer of the receiver corresponding to the MeNB. Therefore, in the present disclosure, the case in which MeNB RLC TX is the RLC layer of the MeNB, and the case in which MeNB RLC RX is the RLC layer corresponding to the MeNB of the terminal will be described by way of example.

However, the embodiment of the present disclosure is not limited thereto, and the contents of the present disclosure may be equally applied even to the situation of the uplink packet transmission. In this case, the transmitter may be the terminal, the receiver may be the base station, and the MeNB RLC TX may be the RLC layer corresponding to the MeNB of the terminal.

On the other hand, when each base station performs the retransmission based on the RLC SN as described above, there is the inefficiency that the overhead of the header is increased by the SN added to the packet, the SN should be unnecessarily managed, or the like. However, when the automatic retransmission request (ARQ) is performed using only the PDCP SN without using the RLC SN, an anchor point of the retransmission should be the MeNB, which may increase the delay time due to the X2 delay. That is, the terminal may request the MeNB to retransmit the packet transmitted through the SeNB because the terminal may not know from which base station the packet not received by the terminal is received, and the MeNB transmits the packet again through the SeNB to cause the X2 delay, such that the delay time may be prolonged. Alternatively, if the retransmission of the packet transmitted through the MeNB is requested through the SeNB, the X2 delay may occur while the SeNB transmits the retransmission request to the MeNB.

Thus, the following provides a method of minimizing a delay time by providing a method for performing a retransmission using a single SN (or referred to as a single SN). Here, the single SN in the present disclosure may include at least one of the PDCP SN, the RLC SN, or any SN.

Figure 4:
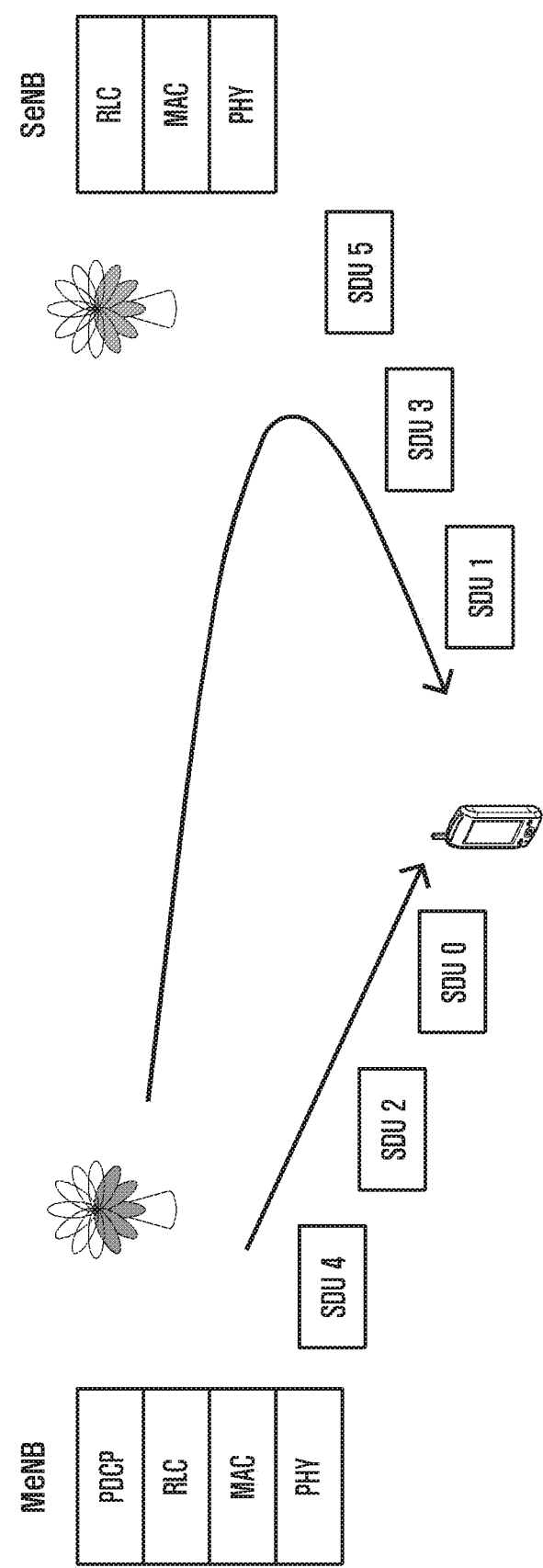
FIG. 4 is a diagram illustrating a situation where each packet is transmitted using a single (SN) according to an embodiment of the present disclosure.

FIG. 4 is a diagram illustrating a situation where each packet is transmitted using a single SN according to an embodiment of the present disclosure.

Referring to FIG. 4, the MeNB may transmit SDU 0, 2, and 4, and the SeNB may transmit SDU 1, 3, and 5, as described in FIG. 2. However, in the present disclosure, a method of transmitting each packet using a single SN different from that of FIG. 2 will be described. Therefore, a detailed method for retransmitting a packet will be described below in the context of FIG. 4. Also, as described above, the present disclosure is described on the assumption of downlink transmission, but the method described in the present disclosure may be similarly applied even in the uplink situation.

Figure 5:
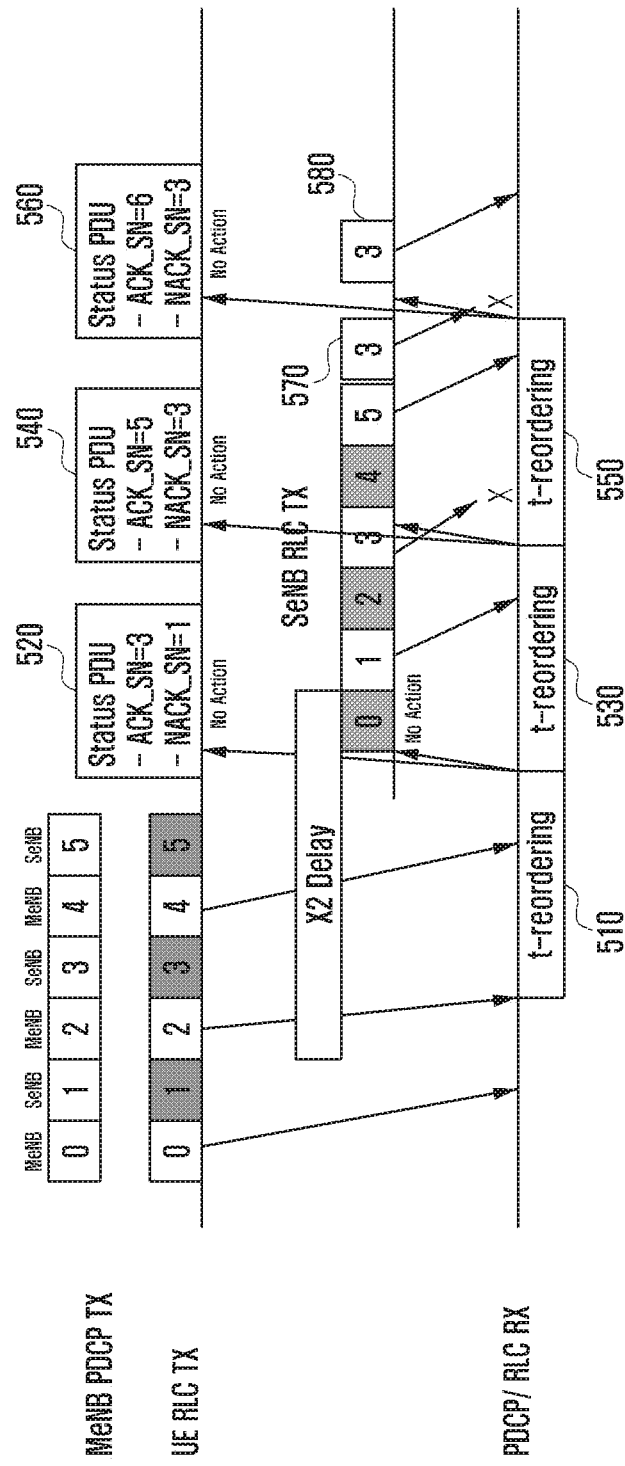
FIG. 5 is a diagram illustrating a detailed method for retransmitting a packet according to an embodiment of the present disclosure.

FIG. 5 is a diagram illustrating a detailed method for retransmitting a packet according to an embodiment of the present disclosure.

Referring to FIG. 5, the terminal may perform an operation of transmitting/receiving and retransmitting a packet using a single RLC. That is, the terminal may be operated as one ARQ entity without having each ARQ entity corresponding to a retransmission apparatus (hereinafter, referred to as ARQ entity) of each base station. Therefore, the terminal may be operated based on one retransmission timer and may know the reception state of the entire packet.

In FIG. 5, the MeNB may transmit packets Nos. 0, 2, and 4, and the SeNB may transmit packets Nos. 1, 3, and 5 after the X2 delay. Therefore, the terminal may first receive packets Nos. 0, 2, and 4.

At this time, if the terminal receives packet No. 0 and then receives packet No. 2, it may determine that packet No. 1 is not received to operate a reordering timer 510. Then, even when the terminal receives packet No. 4, the terminal may wait to receive packet No. 1 until the reordering timer expires without processing packets Nos. 2 and 4. If the reordering timer expires, the terminal may transmit the status report message to the base station by including the number of the non-received packet in the NACK information (NACK_SN). At this time, since the reordering timer has not yet been completed for non-received packet No. 3, according to the present disclosure, the terminal may transmit the status report message to the base station by setting NACK_SN=1.

At this time, since the MeNB and the SeNB transmit a packet to the terminal using a single SN, the terminal may not identify from which base station the lost packet is transmitted. Also, in the case of the packet transmitted through the SeNB, it is impossible to determine whether the packet loss occurs even when the reordering timer expires or whether a packet has not yet arrived because the delay time occurs due to the passage of the X2 interface.

Accordingly, in the present embodiment, the terminal may transmit the status report message to all the accessed base stations (MeNB and SeNB) (520). As described above, the NACK_SN of the status report message may be set to be packet No. 1.

The base station receiving the status report message may identify whether the base station transmits the packet included in the NACK information. For example, the base station may store the transmitted packet as log information. Therefore, the base station may determine whether or not to retransmit the packet included in the NACK information. The base station may perform the retransmission when the packet included in the NACK information is a packet that the base station transmits.

In this figure, the MeNB may not perform the retransmission because it does not transmit packet No. 1. In addition, the SeNB may not perform retransmission because it has no yet transmitted packet No. 1 at the time of receiving the status report message.

Then, the terminal may operate the reordering timer for packets Nos. 1 and 3 (530). Then, the terminal may receive packet No. 1 from the SeNB, and the reordering timer for packet No. 1 may be stopped. On the other hand, if packet No. 3 is not received until the reordering timer expires, the terminal sets the NACK_SN as packet No. 3 and transmits the status report message to the base station (540). The terminal may operate a reordering timer 550 again.

On the other hand, it may be considered that the SeNB transmits packet No. 3 before receiving the status report message. Therefore, if the information indicating that the corresponding packet is not received is included in the status report message within a predetermined time after the base station transmits the corresponding packet, the base station may not retransmit the packet. On the other hand, in the uplink transmission situation, the base station may transmit the information on the preset time to the preset time to the terminal in advance. The base station may transmit the information to the terminal using a radio resource control (RRC) messages or system information.

This figure illustrates the case in which the base station transmits packet No. 3 but the terminal does not receive the packet No. 3, and therefore illustrates the case in which the base station retransmits the packet No. 3 (570).

However, the terminal may receive packet No. 5 while the reordering timer 550 is operated, but may not still receive packet No. 3. When the reordering timer 550 expires, the terminal may transmit the status report message 560 requesting the retransmission of packet No. 3 to the base station when the reordering timer 550 expires.

Therefore, the SeNB may retransmit packet No. 3 (580) and the terminal may receive packet No. 3.

On the other hand, in the case of the MeNB, the terminal receives the status report messages 520, 540 and 560, but does not include any retransmission request for the packet transmitted from the MeNB, and thus does not perform any operation.

In FIG. 5, the operations of the base station and the terminal are summarized as follows.

The first base station MeNB and the second base station SeNB may transmit a packet to the terminal. However, the number of base stations may be changed.

Therefore, the terminal may receive packets through the first base station and the second base station. At this time, as described above, the terminal may receive packets from the first base station and the second base station through one ARQ entity.

The terminal may identify non-received packets through a single SN and may operate the reordering timer if there are packets that are not received.

Also, if the reordering timer expires, the terminal may send the status report message to the base station.

At this time, the terminal may not determine whether the non-received packets are lost or does not arrive due to the delay occurring in the course of being transmitted through the second base station.

Accordingly, the terminal may transmit all the status report messages to the first base station and the second base station.

Accordingly, the first base station and the second base station may receive the status report message, and may retransmit the packet if the packet not received by the terminal is the packet transmitted from the first base station and the second base station.

Figure 6A:
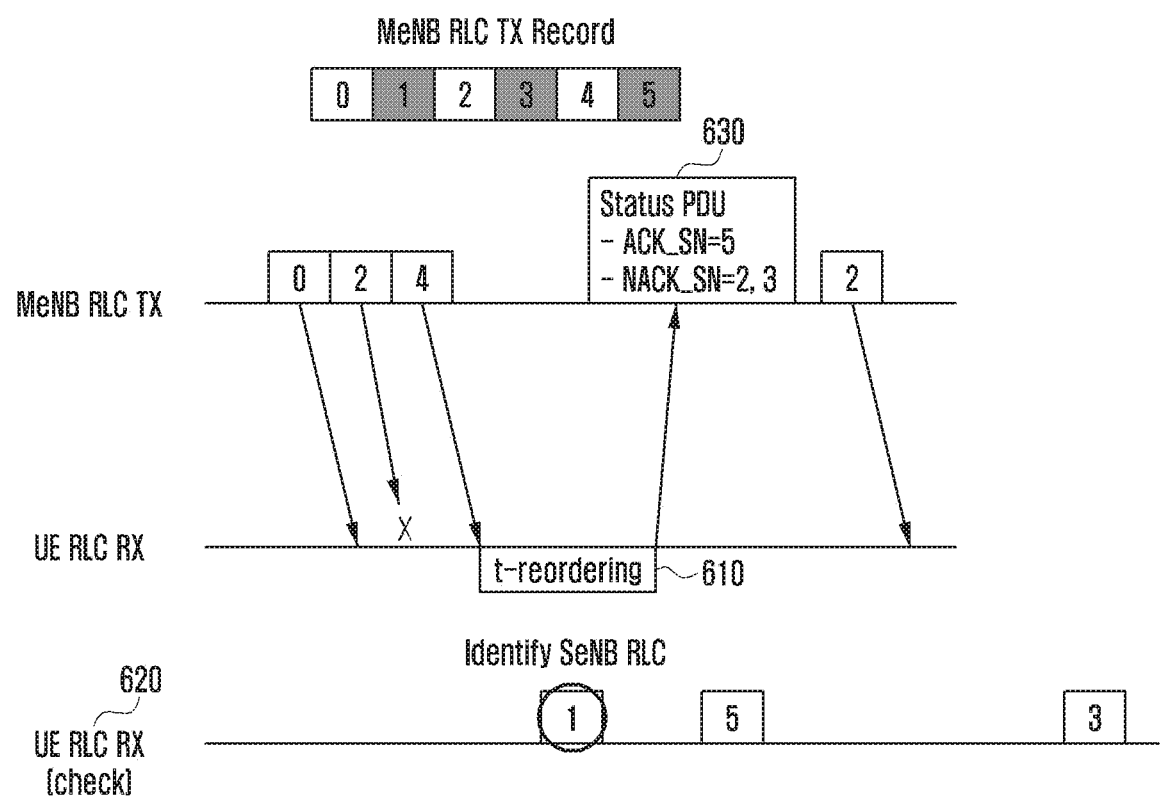
FIGS. 6A and 6B are diagrams illustrating a method for retransmitting a packet according to an embodiment of the present disclosure.
Figure 6B:
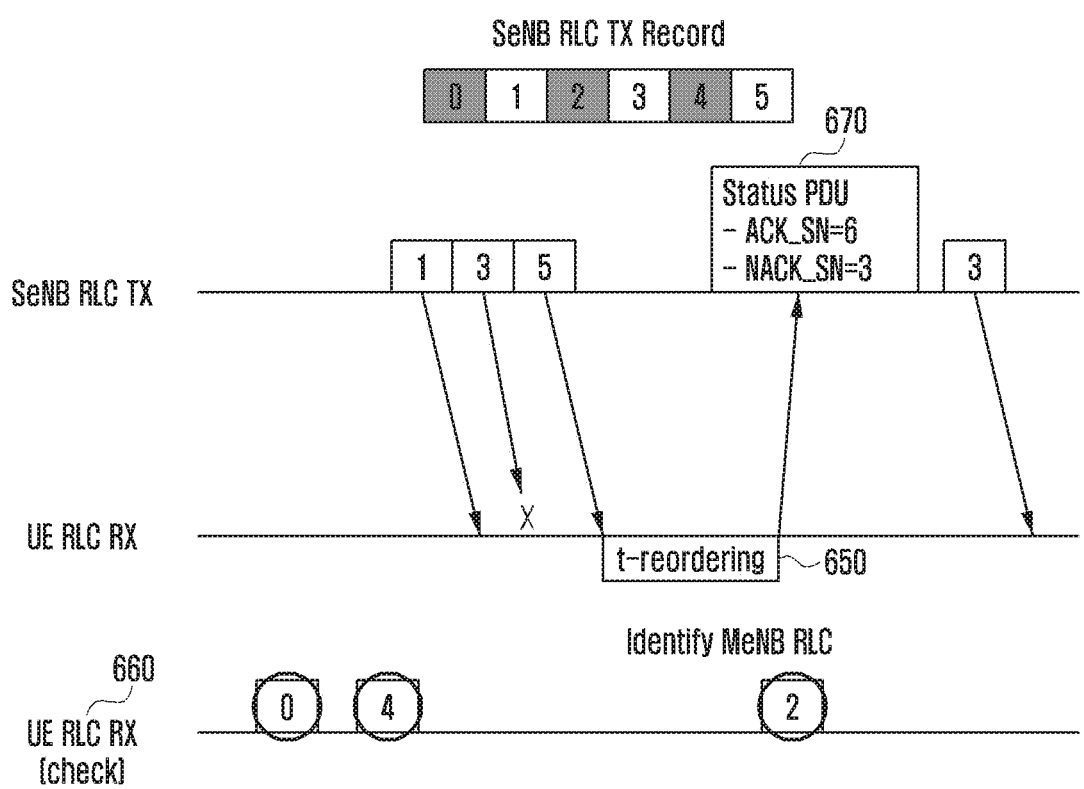

FIGS. 6A and 6B are diagrams illustrating a method for retransmitting a packet according to an embodiment of the present disclosure.

Referring to FIGS. 6A and 6B, the terminal may have a separate protocol stack corresponding to the protocol stack (or ARQ entity) of each base station. That is, the terminal may have ARQ entity corresponding to the ARQ entity of each base station. Therefore, the terminal may receive the packet transmitted from the MeNB through the protocol stack (the present disclosure shows only the RLC layer (MeNB RLC RX), but not limited thereto) corresponding to the MeNB and request the retransmission. In addition, the terminal may receive the packet transmitted from the SeNB through the protocol stack (the present disclosure shows only the RLC layer (SeNB RLC RX), but not limited thereto) corresponding to the SeNB and request the retransmission. FIG. 6A illustrates the process of retransmitting the packet transmitted from the MeNB and FIG. 6B illustrates the process of retransmitting the packet transmitted from the SeNB.

Referring to FIG. 6A, the MeNB may transmit packets Nos. 0, 2, and 4. As described above, the MeNB may store or record the information on the transmitted packets through the log information or the like. Therefore, the terminal may receive the packet. In this case, if the terminal fails to receive packet No. 2, the terminal may operate a reordering timer 610 at the time of receiving packet No. 4.

Then, the terminal may identify the SN of the packet received through the SeNB when the reordering timer 610 expires (620). That is, the terminal may identify the packet received by the terminal through the link between the SeNB and the terminal (620). Alternatively, the terminal may identify the packet received through the RLC layer corresponding to the SeNB.

In this figure, it is assumed that the packet received through the SeNB when the reordering timer expires is packet No. 1.

Therefore, since the terminal receives packet No. 0 and packet No. 4 through the MeNB and receives packet No. 1 through the SeNB, it may be determined that packets Nos. 2 and 3 are lost.

Accordingly, the terminal may transmit the status report message 630 to the base station to request the retransmission of the lost packet. The terminal may set the NACK information (NACK_SN) of the status report message 630 to No. 2 and No. 3 and transmit the NACK information to the base station. On the other hand, the terminal may set the ACK information (ACK_SN) of the status report message to be a value obtained by adding 1 to the number of the received packet. That is, since the terminal has successfully received up to packet No. 4, the ACK_SN may be set to be 5.

Since the MeNB having received the message itself has not transmitted packet No. 3, it may retransmit only packet No. 2 transmitted from the MeNB to the terminal. The MeNB may identify the information on the packet transmitted from the MeNB and retransmit the packet included in the NACK information among the transmitted packets.

Referring to FIG. 6B, the SeNB may transmit packets No. 1, 3, and 5. As described above, the SeNB may store or record the information on the transmitted packets through the log information or the like. Therefore, the terminal may receive the packet. In this case, if the terminal fails to receive packet No. 3, the terminal may operate a reordering timer 650 at the time of receiving packet No. 5.

Then, the terminal may identify the SN of the packet received through the MeNB when the reordering timer 650 expires (660). That is, the terminal may identify the packet received by the terminal through the link between the MeNB and the terminal (660). Alternatively, the terminal may identify the packet received through the RLC layer corresponding to the MeNB.

In this figure, it is assumed that the packet received through the MeNB when the reordering timer expires is packets Nos. 0, 2, and 4.

Therefore, since the terminal receives packet No. 1 and packet No. 5 through the SeNB and receives packets Nos. 0, 2, and 4 through the MeNB, it may be determined that packet No. 3 is lost.

Accordingly, the terminal may transmit the status report message 670 to the base station to request the retransmission of the lost packet. The terminal may set the NACK information (NACK_SN) of the status report message 670 to No. 3 and transmit the NACK information to the base station. On the other hand, the terminal may set the ACK information (ACK_SN) of the status report message to be a value obtained by adding 1 to the number of the received packet. That is, since the terminal has successfully received up to packet No. 5, the ACK_SN may be set to be 6.

The SeNB that has received the message may retransmit packet No. 3 transmitted from the SeNB to the terminal. The SeNB may identify the information on the packet transmitted from the SeNB and retransmit the packet included in the NACK information among the transmitted packets.

In FIGS. 6A and 6B, the operations of the base station and the terminal are summarized as follows.

The first base station MeNB and the second base station SeNB may transmit a packet to the terminal. However, the number of base stations may be changed.

Therefore, the terminal may receive packets through the first base station and the second base station. At this time, as described above, the terminal may receive packets from the first base station and the second base station through the protocol stacks corresponding to each base station.

The terminal may identify non-received packets through a single SN and may operate the reordering timer if there are the non-received packets.

In addition, if the reordering timer expires, the terminal may identify the SN of the packet received through each base station. For example, the first RLC layer of the terminal may identify the SN of the packet received through the second RLC layer of the terminal. In this case, the first RLC layer may refer to the RLC layer corresponding to the first base station, and the second RLC layer may refer to the RLC layer corresponding to the second base station.

Then, the terminal may transmit the status report message to the base station. At this time, the status report message may include the SN of the packet not received by the terminal.

Accordingly, the base station may receive the status report message, and may retransmit the packet if the packet not received by the terminal is the packet transmitted from the base station.

Figure 7A:
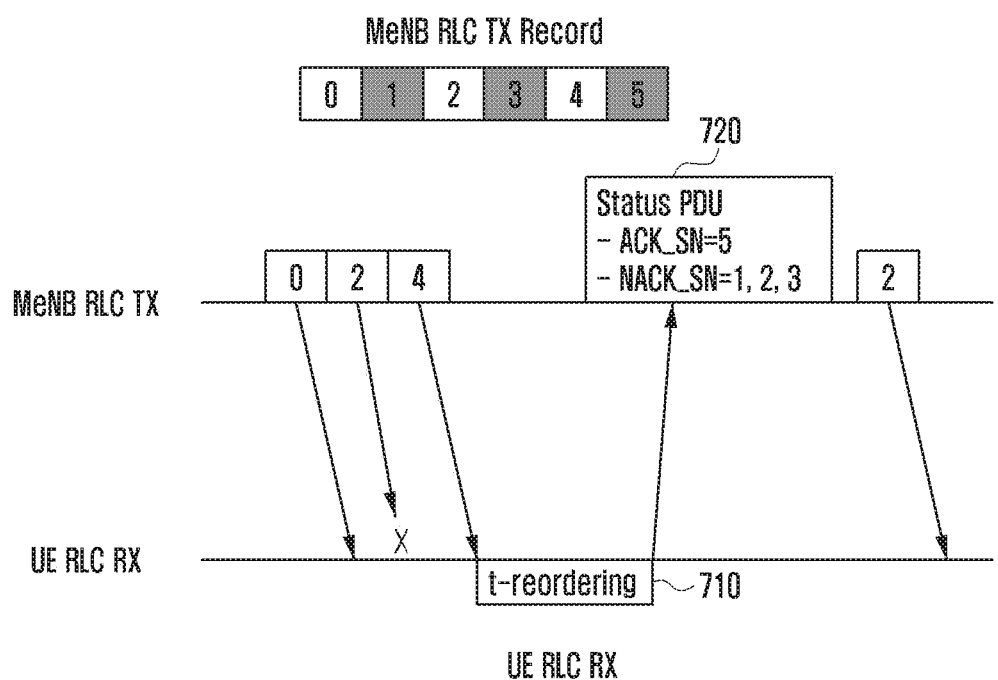
FIGS. 7A and 7B are diagrams illustrating a method for retransmitting a packet according to an embodiment of the present disclosure.
Figure 7B:
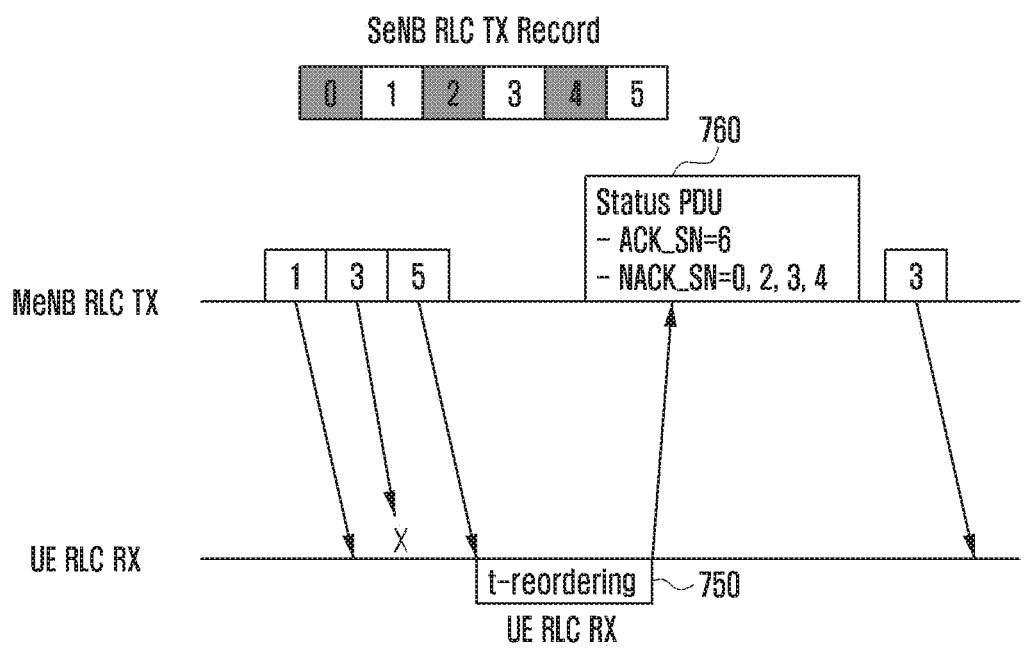

FIGS. 7A and 7B are diagrams illustrating a method for retransmitting a packet according to an embodiment of the present disclosure.

Referring to FIGS. 7A and 7B, as described in FIGS. 6A and 6B, the terminal may have a separate protocol stack corresponding to the protocol stacks (or ARQ entity) of each base station. Therefore, the terminal may receive the packet transmitted from the MeNB through the protocol stack (the present disclosure shows only the RLC layer (MeNB RLC RX), but not limited thereto) corresponding to the MeNB and request the retransmission. In addition, the terminal may receive the packet transmitted from the SeNB through the protocol stack (the present disclosure shows only the RLC layer (SeNB RLC RX), but not limited thereto) corresponding to the SeNB and request the retransmission. FIG. 7A illustrates the process of retransmitting the packet transmitted through the MeNB and FIG. 6B illustrates the process of retransmitting the packet transmitted through the SeNB. In the embodiment of FIGS. 7A and 7B are performed independently.

Referring to FIG. 7A, the MeNB may transmit packets Nos. 0, 2, and 4. As described above, the MeNB may store or record the information on the transmitted packets through the log information or the like.

Therefore, the terminal may receive the packet. In this case, if the terminal fails to receive packet No. 2, the terminal may operate a reordering timer 710 at the time of receiving packet No. 4.

The terminal may transmit the status report message 720 to the MeNB when the reordering timer 710 expires. At this time, since the terminal receives packet No. 0 and packet No. 4 through the MeNB and does not know the packet received through the SeNB, it may be determined that packets Nos. 1, 2, and 3 are lost.

Accordingly, the terminal may transmit the status report message 720 to the base station to request the retransmission of the lost packet. The terminal may set the NACK information (NACK_SN) of the status report message 720 to Nos. 1, 2, and 3 and transmit the NACK information to the base station. On the other hand, the terminal may set the ACK information (ACK_SN) of the status report message to be a value obtained by adding 1 to the number of the packet successfully received. That is, since the terminal has successfully received up to packet No. 4, the ACK_SN may be set to be 5.

Since the MeNB having received the message itself has not transmitted packets Nos. 1 and 3, it may retransmit only packet No. 2 transmitted from the MeNB to the terminal. The MeNB may identify the information on the packet transmitted from the MeNB and retransmit the packet included in the NACK information among the transmitted packets.

Referring to FIG. 7B, the SeNB may transmit packets No. 1, 3, and 5. As described above, the SeNB may store or record the information on the transmitted packets through the log information or the like.

Therefore, the terminal may receive the packet. In this case, if the terminal fails to receive packet No. 3, the terminal may operate a reordering timer 750 at the time of receiving packet No. 5.

The terminal may transmit the status report message 760 to the SeNB when the reordering timer 750 expires. At this time, since the terminal receives packet No. 1 and packet No. 5 and does not know the packet received through the MeNB, it may be determined that packets Nos. 1, 2, and 3 are lost.

Accordingly, the terminal may transmit the status report message 770 to the base station to request the retransmission of the lost packet. The terminal may set the NACK information (NACK_SN) of the status report message 770 to Nos. 2, 3, and 4 and transmit the NACK information to the base station. On the other hand, the terminal may set the ACK information (ACK_SN) of the status report message to be a value obtained by adding 1 to the number of the packet successfully received. That is, since the terminal has successfully received up to packet No. 5, the ACK_SN may be set to be 6.

Since the SeNB having received the message itself has not transmitted packets Nos. 2 and 4, it may retransmit packet No. 3 transmitted from the SeNB to the terminal. The SeNB may identify the information on the packet transmitted from the SeNB and retransmit the packet included in the NACK information among the transmitted packets.

In FIGS. 7A and 7B, the operations of the base station and the terminal are summarized as follows.

The first base station MeNB and the second base station SeNB may transmit a packet to the terminal. However, the number of base stations may be changed.

Therefore, the terminal may receive packets through the first base station and the second base station. At this time, as described above, the terminal may receive packets from the first base station and the second base station through the protocol stacks corresponding to each base station.

The terminal may identify the non-received packets through a single SN and may operate the reordering timer if there are the non-received packets.

In addition, if the reordering timer expires, the terminal may identify the SN of the packet received through the corresponding protocol. For example, the first RLC layer of the terminal may identify the SN of the packet received through the first base station. At this time, the first RLC layer may refer to the RLC layer corresponding to the first base station.

Then, the terminal may transmit the status report message to the base station. At this time, the status report message may include the SN of the packet not received by the terminal.

Accordingly, the base station may receive the status report message, and may retransmit the packet if the packet not received by the terminal is the packet transmitted from the base station.

Figure 8A:
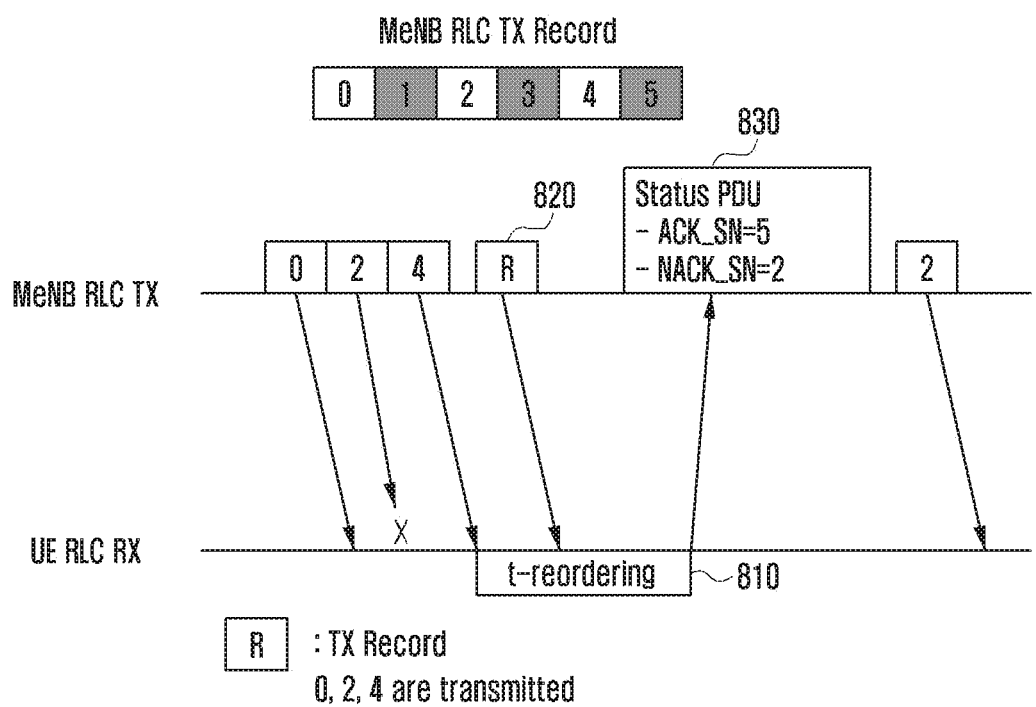
FIGS. 8A and 8B are diagrams illustrating a method for retransmitting a packet according to an embodiment of the present disclosure.
Figure 8B:
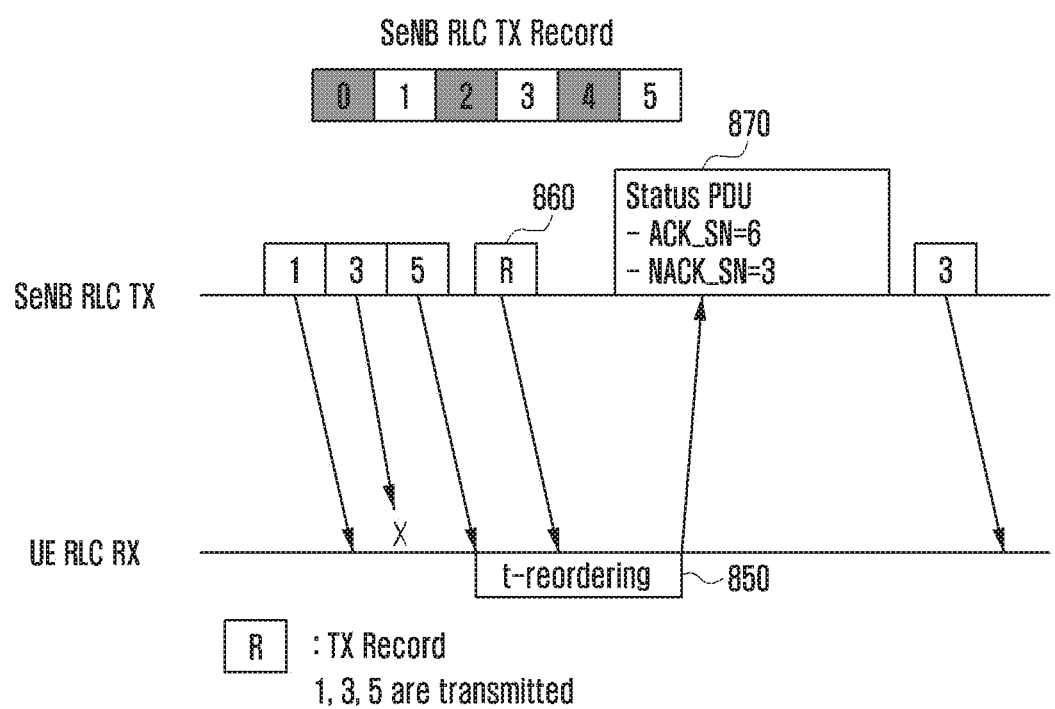

FIGS. 8A and 8B are diagrams illustrating a method for retransmitting a packet according to an embodiment of the present disclosure.

Referring to FIGS. 8A and 8B, as described in FIGS. 6A and 6B, the terminal may have a separate protocol stack corresponding to the protocol stacks (or ARQ entity) of each base station. That is, the terminal may have ARQ entity corresponding to the ARQ entity of each base station. The detailed contents are the same as those described above and therefore will be omitted below.

In this figure, a method of retransmitting a packet using a record message (referred to as R message, record PDU, gap information or the like, which may be expressed by R in the following description) notifying to the terminal what packet the base station has transmitted.

Referring to FIG. 8A, the MeNB may transmit packets Nos. 0, 2, and 4. As described above, the MeNB may store or record the information on the transmitted packet.

Therefore, the terminal may receive the packet. In this case, if the terminal fails to receive packet No. 2, the terminal may operate a reordering timer 810 at the time of receiving packet No. 4.

Meanwhile, in the present disclosure, the base station may transmit the record message 820 to the terminal after transmitting packet No. 4. The MeNB may generate the record message using the stored information about the transmitted packet, and may transmit the generated record message to the terminal. The record message may be transmitted after the transmission of all the packets is completed, or may be transmitted once after transmitting a predetermined amount of packets.

The base station may transmit the record message in the form of an RLC control PDU or the like. Alternatively, the base station may transmit the record message by including the record message in a header of another RLC data PDU.

Meanwhile, in an uplink transmission situation, the base station may receive the record message from the terminal. At this time, the base station may transmit configuration information for transmitting the record message to the terminal in advance. For example, the base station may transmit the record message transmission related information to the terminal using the RRC message, the system information, or the like. The detailed content thereof will be described below.

In this figure, since the MeNB has transmitted packets 0, 2, and 4, the content indicating that the packets Nos. 0, 2, and 4 have been transmitted is displayed on the record message and may be transmitted to the terminal. The concrete structure of the record message will be described later.

The terminal may transmit the status report message 830 for requesting the retransmission of the lost packet to the MeNB when the reordering timer 810 expires. At this time, the terminal may generate the status report message based on the record message. Specifically, the terminal may transmit to the base station the status report message including the packet that is identified as being transmitted from the base station based on the record message among the packets that are not received and is included in the NACK information.

In this figure, the terminal receives packets No. 0 and 4 through the MeNB, and may identify that packet No. 2 among the packets transmitted from the MeNB has not been received through the record message. Accordingly, the terminal may transmit to the base station the status report message including packet No. 2 included in the NACK information.

At this time, the terminal may update the reordering timer and the received information by considering the packets (Nos. 1, 3, and 5) not included in the record message as being received. However, the record message does not include only the information on the transmitted packet, but may include information on a non-transmitted packet, bitmap information capable of distinguishing the transmitted/non-transmitted packet, and the like.

Referring to FIG. 8B, the SeNB may transmit packets No. 1, 3, and 5. As described above, the SeNB may store or record the information on the transmitted packet.

Therefore, the terminal may receive the packet. In this case, if the terminal fails to receive packet No. 3, the terminal may operate a reordering timer 860 at the time of receiving packet No. 5.

Meanwhile, in the present disclosure, the base station may transmit the record message 860 to the terminal after transmitting packet No. 5. The MeNB may generate the record message using the stored information about the transmitted packet, and may transmit the generated record message to the terminal. The record message may be transmitted after the transmission of all the packets is completed, or may be transmitted once after transmitting a predetermined amount of packets.

In this figure, since the MeNB has transmitted packets 1, 3, and 5, the content indicating that the packets Nos. 1, 3, and 5 have been transmitted is displayed in the record message and may be transmitted to the terminal. The concrete structure of the record message will be described later.

The terminal may transmit the status report message 870 for requesting the retransmission of the lost packet to the MeNB when the reordering timer 850 expires. At this time, the terminal may generate the status report message based on the record message. Specifically, the terminal may transmit to the base station the status report message including the packet that is identified as being transmitted from the base station based on the record message among the packets that are not received and is included in the NACK information.

In this figure, the terminal receives packets No. 1 and 5 through the MeNB, and may identify that packet No. 3 among the packets transmitted from the MeNB has not been received through the record message. Accordingly, the terminal may transmit to the base station the status report message including packet No. 3 included in the NACK information.

At this time, the terminal may update the reordering timer and the received information by considering the packets (Nos. 0, 2, and 4) not included in the record message as being received. However, the record message does not include only the information on the transmitted packet, but may include information on a non-transmitted packet, bitmap information capable of distinguishing the transmitted/non-transmitted packet, and the like.

Figure 9A:
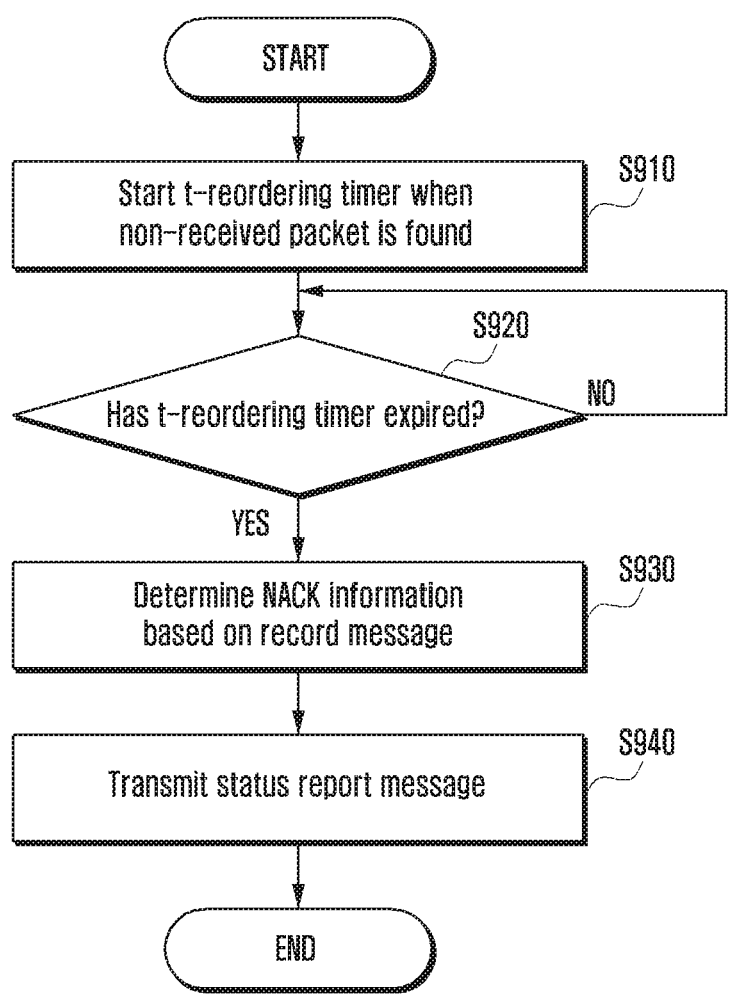
FIG. 9A is a flow chart illustrating a method of retransmitting a packet using a record message according to an embodiment of the present disclosure.

FIG. 9A is a flow chart illustrating a method of retransmitting a packet using a recording message according to an embodiment of the present disclosure.

Referring to FIG. 9A, the terminal may start the reordering timer in operation S910. The terminal may start the reordering timer if a non-received packet is found. The terminal may receive the record message after starting the reordering timer.

In operation S920, the terminal may determine whether the reordering timer expires.

If the reordering timer expires, the terminal may determine the NACK information (NACK_SN) based on the record message in operation S930. The record message may include the information on the packet transmitted from the base station. Therefore, the terminal may identify the packet transmitted from the base station based on the record message. Then, the terminal may determine the NACK information by excluding the packet displayed on the record message as being not transmitted among the non-received packets.

In operation 940, the status report message including the NACK information may be transmitted to the base station. The terminal may transmit the status report message to the base station to request the retransmission of the lost packet.

Therefore, the base station may retransmit the packet using the NACK information included in the status report message.

Meanwhile, as described above, the present disclosure may be applied even to the uplink. In this case, the terminal may transmit to the base station the record message including the information on the packet transmitted from the terminal. At this time, the base station may transmit to the terminal the configuration information that allows the terminal to transmit the record message.

Specifically, the configuration information may include information, such as period information (GapPeriod), data size information (GapByte), packet number information (GapPDU), and timer information (T-GapProhibit), that includes the record message.

The above-described configuration information may be transmitted to the terminal through the RRC message. The RRC message may include an RRC Connection Reconfiguration, an RRC Connection Setup message, an RRC Connection Reestablishment message, and the like.

The period information (GapPeriod) may include information associated with a time interval at which the record message is transmitted.

The data size information (GapPeriod) may include information related to an interval of a data size for transmitting the record message. That is, the data size information may refer to the information indicating how many bytes of data are transmitted and then the record message is transmitted.

The packet number information (GapPeriod) may include the information related to the packet number interval at which the record message is transmitted. That is, the packet number information may refer to information indicating whether to repeatedly transmit the record message for few PDUs.

The timer information (T-GapProhibit) may include a timer value to prevent the transmission of the record message. The terminal may transmit the record message and then transmit the next record message after at least the timer information. Accordingly, if the record message is transmitted, the timer is operated, and the terminal may transmit the record message until the timer expires.

Accordingly, the terminal may transmit the record message when the period of the record message transmission arrives, the size of the transmitted data exceeds GapByte, or the number of transmitted packets reaches the GapPDU. Alternatively, the record message may be transmitted according to a combination of the above-described conditions. In addition, the timer may be operated to prevent the record message from being frequently transmitted, and the record message may not be transmitted during the driving of the timer.

The information included in the above-mentioned RRC message may be expressed as follows.

TABLE 1

GapPeriod ::= ENUMERATED{ms5, ms10, ms15, ms20, ms25, ms30, ms35, ms40}
GapByte ::= ENUMERATED{kb100, kb200, kb400, kb800, kb1600, kb3200, kb6400, kb12800, kb25600}
GapPDU ::= ENUMERATED{p4, p8, p16, p32, p64, p128, p256, p512}
T-GapProhibit ::= ENUMERATED{ms5, ms10, ms15, ms20, ms25, ms30, ms35, ms40}

Figure 9B:
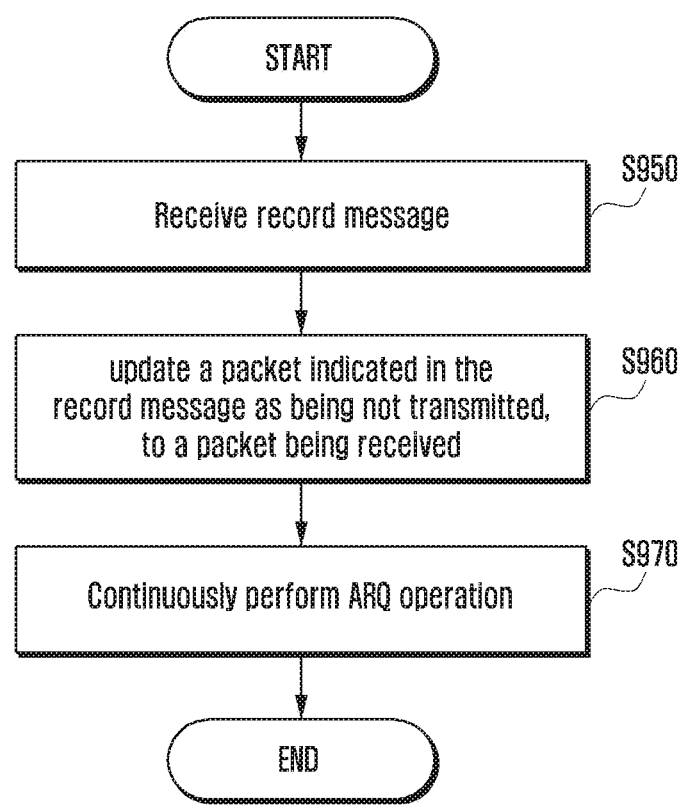
FIG. 9B is a flow chart illustrating a method of retransmitting a packet using a record message according to an embodiment of the present disclosure.

FIG. 9B is a flow chart illustrating a method of retransmitting a packet using a record message according to an embodiment of the present disclosure.

Referring to FIG. 9B, in operation S950, the terminal may receive the record message. The record message may include the information on the packet transmitted from the base station. Therefore, the terminal may identify the packet transmitted from the base station based on the record message.

In operation S960, the terminal may update the packet, which is indicated in the record message as being not transmitted, to the packet being received.

The terminal can continue to perform the ARQ operation in operation S970. That is, the terminal may identify the non-received packet. Accordingly, the terminal may transmit to the base station the status report message including the information of the non-received packet included in the NACK information.

The contents described in FIG. 9B may be performed separately or may be performed by being included in the process of FIG. 9A. For example, if the reordering timer is started in FIG. 9A and the recording message is received, the terminal may update the packet displayed as not being transmitted in the record message according to the operation of FIG. 9B to the packet received.

Accordingly, when the reordering timer expires, the terminal may include the SN of the non-received packet in the NACK information in the operation of determining the NACK information. The terminal may transmit the status report message including the NACK information to the base station.

As described above, the contents of the present disclosure may also be used in uplink transmission.

FIGS. 10A and 10B are diagrams illustrating a form of a record message according to an embodiment of the present disclosure.

Referring to FIG. 10A, the record message may consist of a PDU control format.

At this time, the D/C is a field indicating whether the PDU is a data PDU or a control PDU. In the case of the record message, the D/C may be displayed as the control PDU.

The PDU type information (PDU Type) is a field indicating the type of the PDU. In the case of the record message, the PDU Type may be displayed to indicate the record message. Therefore, in the present disclosure, the PDU type information may be referred to as record message indication information. For example, to indicate the record message, the PDU type may be displayed by the record PDU, the gap information or the like.

The method for displaying the transmitted packet on the record message may be various. In this figure, for example, the record message may include information on a SN of a packet that the transmitter transmits latest (last transmitted SN) and bitmap information indicating a packet previously transmitted.

Also, the record message may include the information on the packet to be certainly transmitted. The record message has not yet been transmitted but may include the SN of the packet to be transmitted. Alternatively, the bitmap information indicating the packet may also be included. Accordingly, the terminal may receive the information on the packet to be transmitted from the base station, and if the packet is not received, may transmit the status report message indicating that the packet was not received.

Accordingly, the receiver may identify the SN of the last received packet using the record message and the packet previously transmitted from the transmitter based on the form of the bitmap.

Referring to FIG. 10B, an example of the record message when the SeNB transmits packets Nos. 1, 3, and 5 and then transmits the record message in FIG. 8B may be checked.

The D/C indicated by 0 may indicate the control PDU, and the PDU Type may be displayed by the gap information indicating the record message.

The transmitter may notify that the last transmitted SN is displayed by 5 and packet No. 5 is transmitted recently. In addition, the transmitter may display the record message such as 01010 in descending order from 4 in a bitmap format and transmit the displayed record message to the receiver. It may be confirmed that packets Nos. 4, 2, and 0 are not yet transmitted according to the above bitmap and packets Nos. 1 and 3 are transmitted. The information included in the record message may be expressed in various formats, and various methods may be used as long as it may indicate which packet is transmitted.

Figure 11:
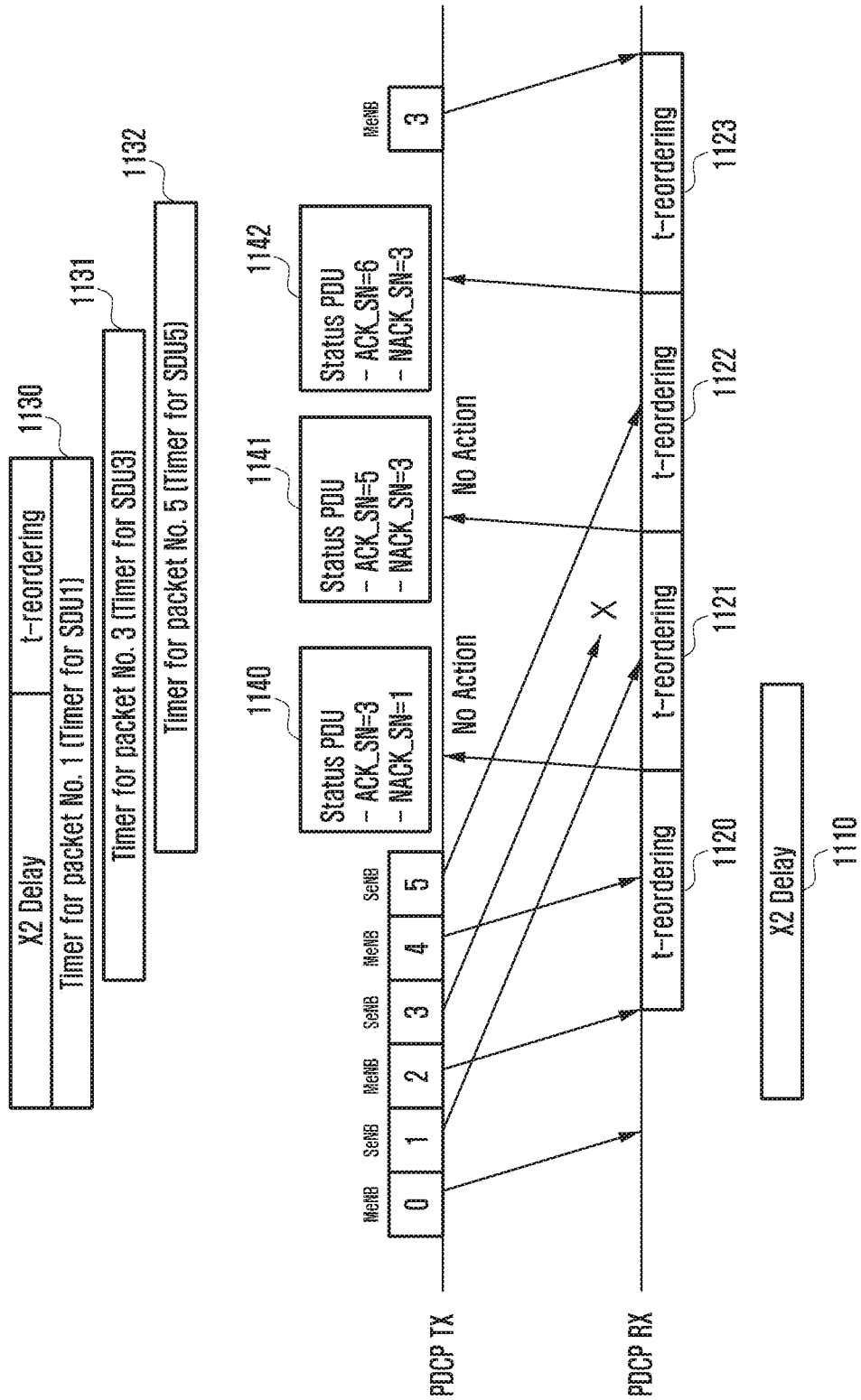
FIG. 11 is a diagram illustrating a method for retransmitting a packet according to an embodiment of the present disclosure.

FIG. 11 is a diagram illustrating a method for retransmitting a packet according to an embodiment of the present disclosure.

Referring to FIG. 11, the base station and the terminal may perform a single ARQ transmission/reception operation. In the present embodiment, the method of performing a retransmission in the PDCP layer of the base station and the terminal in the protocol stack of the split bearer of the dual connectivity will be described.

The transmitter (PDCP TX) may know through which base station the packet was transmitted. In addition, if the transmitter is the base station, the approximate X2 delay time may be known. If the transmitter is the terminal, the base station may notify the X2 delay time using the RRC message or the like.

If the X2 delay time is large, when the receiver transmits the status report message after the reordering timer expires, the transmitter may identify or predict whether the packet displayed on the NACK information is lost or is being transmitted.

Specifically, if the packet is transmitted to the SeNB, the packet may experience the X2 delay and the status report message for the packet may be transmitted after the reordering timer expires. Therefore, it is preferable that only when the status report message for the packet transmitted to the SeNB arrives after the sum of the minimum X2 delay time and the value of the reordering timer, it is determined that the actual packet is lost and the retransmission is performed.

Therefore, in the present embodiment, the transmitter may set the timer for determining the packet loss and may not perform the retransmission if a status report message arrives before the timer expires.

At this time, the timer value may be set for each packet or may be operated by a single timer in the transmitter. At this time, the timer value may be set to be the same value as the sum of the X2 delay time and the reordering timer, or may also be set in the network as a separate value.

The base station notifies the terminal of the value of the timer for the packet using the RRC message or the system information. The status information message may be transmitted on the link having the shortest X2 delay for fast transmission or on a link that may transmit the feedback to the transmitter as fast as possible.

Referring to FIG. 11, it is assumed that packet No. 3 among the packets transmitted through the SeNB is lost. Also, since packets Nos. 1, 3, and 5 are transmitted through the SeNB, it is assumed that the transmission time is delayed due to the X2 delay (1110).

Therefore, the transmitters MeNB and SeNB may transmit each packet to the receiver. The receiver may receive packet No. 2 after receiving packet No. 0, and may not operate a reordering timer 1120 because it has not received packet No. 1. If the reordering timer expires, the receiver may transmit to the transmitter a status report message 1140 including the SN of the non-received packet included in the NACK information (NACK_SN). In this figure, NACK_SN=1.

The transmitter may operate a timer 1130 for packet No. 1 after transmitting packet No. 1. Since the timer 1130 for packet No. 1 has not yet expired when the status report message 1140 is received, the transmitter may not perform a retransmission.

On the other hand, the receiver may operate a reordering timer 1121 after the reordering timer 1120 expires. It may be confirmed that packet No. 1 is received but packet No. 3 is lost during the driving of the timer. Therefore, the receiver may transmit a status report message 1141 to the transmitter that sets NACK_SN=3 after the reordering timer 1121 expires.

The transmitter may operate the timer 1131 for packet No. 3 after transmitting packet No. 3 and since the timer 1131 has not expired when the status report message 1141 is received, the transmitter may not perform the retransmission.

The receiver may operate a reordering timer 1122 after the reordering timer 1121 expires. The receiver may receive packet No. 5.

However, since the transmitter does not retransmit packet No. 3, the receiver may still not receive the packet No. 3. Therefore, the receiver may transmit a status report message 1142 to the transmitter that sets NACK_SN=3 after a reordering timer 1122 expires.

Since the timer 1142 for packet No. 3 expires when the status report message 1142 is received, the transmitter may retransmit the packet No. 3.

The operations of the transmitter and the receiver of FIG. 11 are as follows.

The transmitter may transmit the packet to the receiver. At this time, the transmitter may include at least one base station, and may transmit the packet to the terminal through the first base station and the second base station.

Therefore, the terminal may receive packets through the first base station and the second base station. At this time, as described above, the terminal may receive packets from the first base station and the second base station through the protocol stacks corresponding to each base station. However, in the present embodiment, the terminal may perform the retransmission in the single PDCP layer.

The terminal may identify the non-received packets through a single SN and may operate the reordering timer if there are the non-received packets.

Also, if the reordering timer expires, the terminal may send the status report message to the base station. The PDCP layer of the terminal may identify the packet received from the first base station through the first RLC layer and the packet received from the second RLC layer through the second RLC layer and transmit to the base station the status report message for the packet that is not received.

Meanwhile, the first base station may operate the timer for the packet transmitted through the second base station. Specifically, the PDCP layer of the first base station may operate the timer for the packet transmitted through the second base station. However, the embodiment of the present disclosure is not limited thereto, and the first base station may operate the timer for the packet transmitted through the first base station. In addition, if the terminal is connected to three or more base stations, the first base station may operate each timer for packets transmitted through the respective base stations.

As described above, the timer may be determined based on a value obtained by adding the X2 delay time and the time of the reordering timer. However, the first base station may operate the timer for the packet transmitted through the first base station. The PDCP layer of the first base station may receive the status report message and may not perform the retransmission if the timer for the packet not received by the terminal has not expired.

On the other hand, if the timer for the packet expires, the PDCP layer of the first base station may perform the retransmission.

Figure 12:
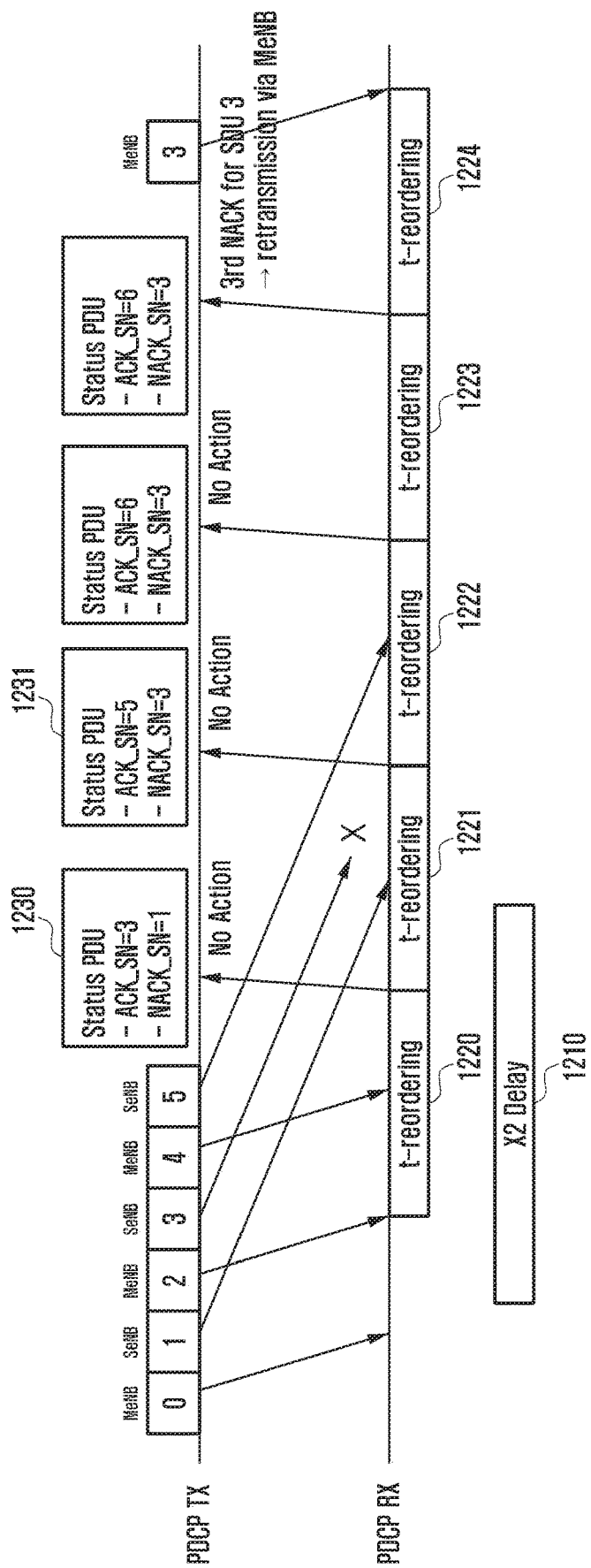
FIG. 12 is a diagram illustrating a method for retransmitting a packet according to an embodiment of the present disclosure.

FIG. 12 is a diagram illustrating a method for retransmitting a packet according to an embodiment of the present disclosure.

Referring to FIG. 12, the base station and the terminal may perform a single ARQ transmission/reception operation. In the present embodiment, the method of performing a retransmission in the PDCP layer of the base station and the terminal in the protocol stack of the split bearer of the dual connectivity will be described.

The transmitter (PDCP TX) may know through which base station the packet was transmitted. In addition, the transmitter may know the approximate X2 delay time. If the transmitter is the terminal, the base station may notify the X2 delay time using the RRC message or the like.

If the X2 delay time is large, when the receiver transmits the status report message after the reordering timer expires, the transmitter may identify or predict whether the packet displayed on the NACK information is lost or is being transmitted.

Specifically, if the packet is transmitted to the SeNB, the packet may experience the X2 delay and the status report message for the packet may be transmitted after the reordering timer expires. Therefore, it is preferable that only when the status report message for the packet transmitted to the SeNB arrives after the sum of the minimum X2 delay time and the value of the reordering timer, it is determined that the actual packet is lost and the retransmission is performed.

Therefore, in the present embodiment, the transmitter may set the number of NACK for determining the packet loss. Therefore, the transmitter may perform the retransmission when the NACK for the packet that undergoes the X2 delay is received by a predetermined number. The status information message may be transmitted on the link having the shortest X2 delay for fast transmission or on a link that may transmit the feedback to the transmitter as fast as possible.

Referring to FIG. 12, it is assumed that packet No. 3 among the packets transmitted through the SeNB is lost. Also, since packets Nos. 1, 3, and 5 are transmitted through the SeNB, it is assumed that the transmission time is delayed due to the X2 delay (1210).

In addition, it is assumed that the retransmission is performed when the NACK is received three times for the packet transmitted through the SeNB. However, the set number of times may be changed.

Therefore, the transmitters MeNB and SeNB may transmit each packet to the receiver. The receiver may receive packet No. 2 after receiving packet No. 0, and may not operate a reordering timer 1220 because it has not received packet No. 1. If the reordering timer expires, the receiver may transmit to the transmitter a status report message 1230 including the SN of the non-received packet included in the NACK information (NACK_SN). In this figure, NACK_SN=1.

The transmitter may not perform the retransmission since the NACK for packet No. 1 is first received.

On the other hand, the receiver may operate a reordering timer 1221 after the reordering timer 1220 expires. It may be confirmed that packet No. 1 is received but packet No. 3 is lost during the driving of the timer. Therefore, the receiver may transmit a status report message 1231 to the transmitter that sets NACK_SN=3 after the reordering timer 1221 expires.

The transmitter may not perform the retransmission since the NACK for packet No. 3 is first received.

The receiver may operate a reordering timer 1221 after the reordering timer 1222 expires. The receiver may receive packet No. 5.

However, since the transmitter does not retransmit packet No. 3, the receiver may still not receive the packet No. 3. Therefore, the receiver may transmit a status report message 1242 to the transmitter that sets NACK_SN=3 after the reordering timer 1222 expires.

The transmitter may not perform the retransmission since the NACK for packet No. 3 is received twice.

The receiver may operate a reordering timer 1223 after the reordering timer 1222 expires. However, since the transmitter does not retransmit packet No. 3, the receiver may still not receive the packet No. 3. Therefore, the receiver may transmit a status report message 1242 to the transmitter that sets NACK_SN=3 after the reordering timer 1223 expires.

Since the third NACK for packet No. 3 is received when the status report message 1242 is received, the transmitter may retransmit the packet No. 3.

The operations of the transmitter and the receiver of FIG. 12 are as follows.

The transmitter may transmit the packet to the receiver. At this time, the transmitter may include at least one base station, and may transmit the packet to the terminal through the first base station and the second base station.

Therefore, the terminal may receive packets through the first base station and the second base station. At this time, as described above, the terminal may receive packets from the first base station and the second base station through the protocol stacks corresponding to each base station. However, in the present embodiment, the terminal may perform the retransmission in the single PDCP layer.

The terminal may identify the non-received packets through the single SN and may operate the reordering timer if there are the non-received packets.

Also, if the reordering timer expires, the terminal may send the status report message to the base station. The PDCP layer of the terminal may identify the packet received from the first base station through the first RLC layer and the packet received from the second RLC layer through the second RLC layer and transmit to the base station the status report message for the packet that is not received.

The PDCP layer of the base station may count the frequency of NACKs included in the status report message. If the frequency of the NACK does not exceed a threshold, the base station may not perform the retransmission.

Therefore, the PDCP layer of the first base station may receive the status report message and may not perform the retransmission if the reception frequency of the NACK for the packet not received by the terminal does not exceed the threshold.

On the other hand, if the reception frequency of the NACK for the packet exceeds the threshold, the PDCP layer of the first base station may perform the retransmission.

Figure 13:
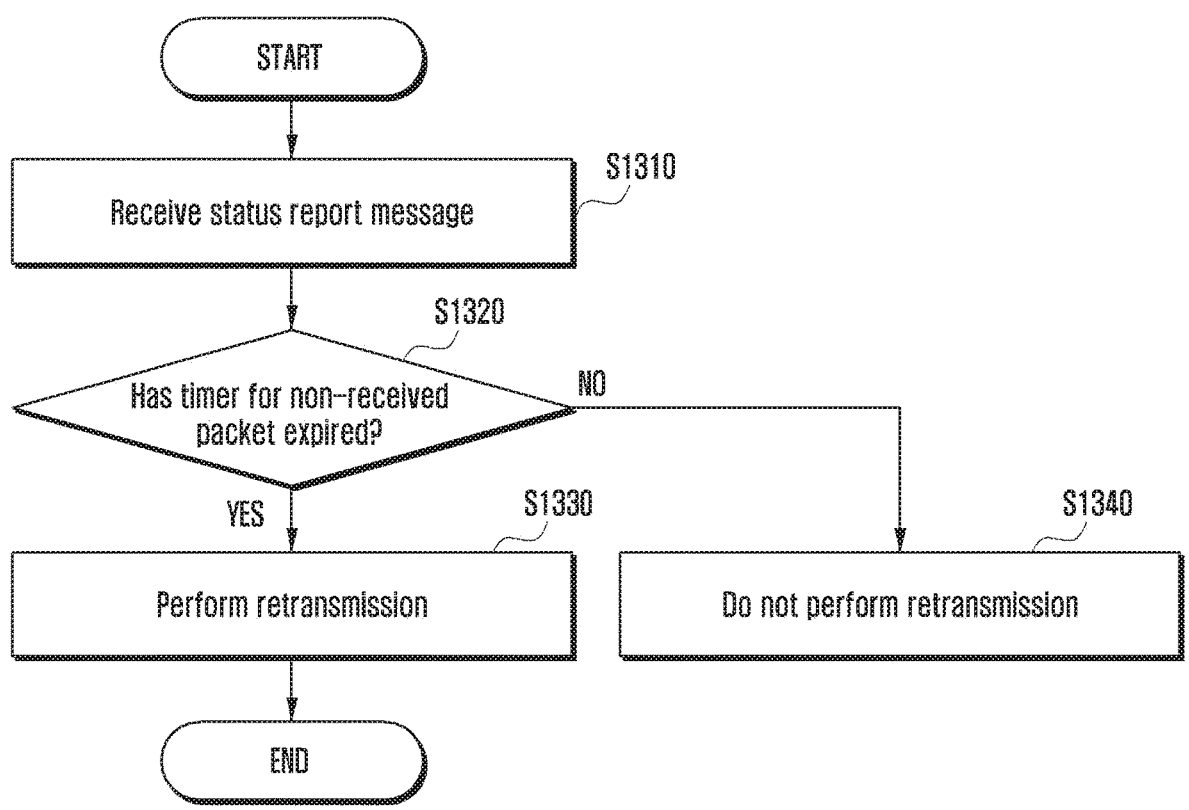
FIG. 13 is a flow chart illustrating the method of retransmitting a packet described in FIG. 11 according to an embodiment of the present disclosure.

FIG. 13 is a flow chart illustrating the method of retransmitting a packet described in FIG. 11 according to an embodiment of the present disclosure.

Referring to FIG. 13, the method for retransmitting a packet when the timer expires by setting the timer for the packet as illustrated in FIG. 11 will be described.

The transmitter may receive the status report message from the receiver in operation S1310. The status report message may include the information on the packet not received by the receiver.

In operation S1320, the transmitter may determine whether or not the timer for the non-received packet expires.

If the timer expires, the transmitter may perform the packet retransmission in operation S1330. That is, the transmitter may retransmit the packet included in the NACK information to the receiver.

On the other hand, if the timer has not expired, the transmitter may not perform the packet retransmission in operation S1340. It is determined that the packet does not arrive due to the transmission delay, such that the retransmission is not performed.

Figure 14:
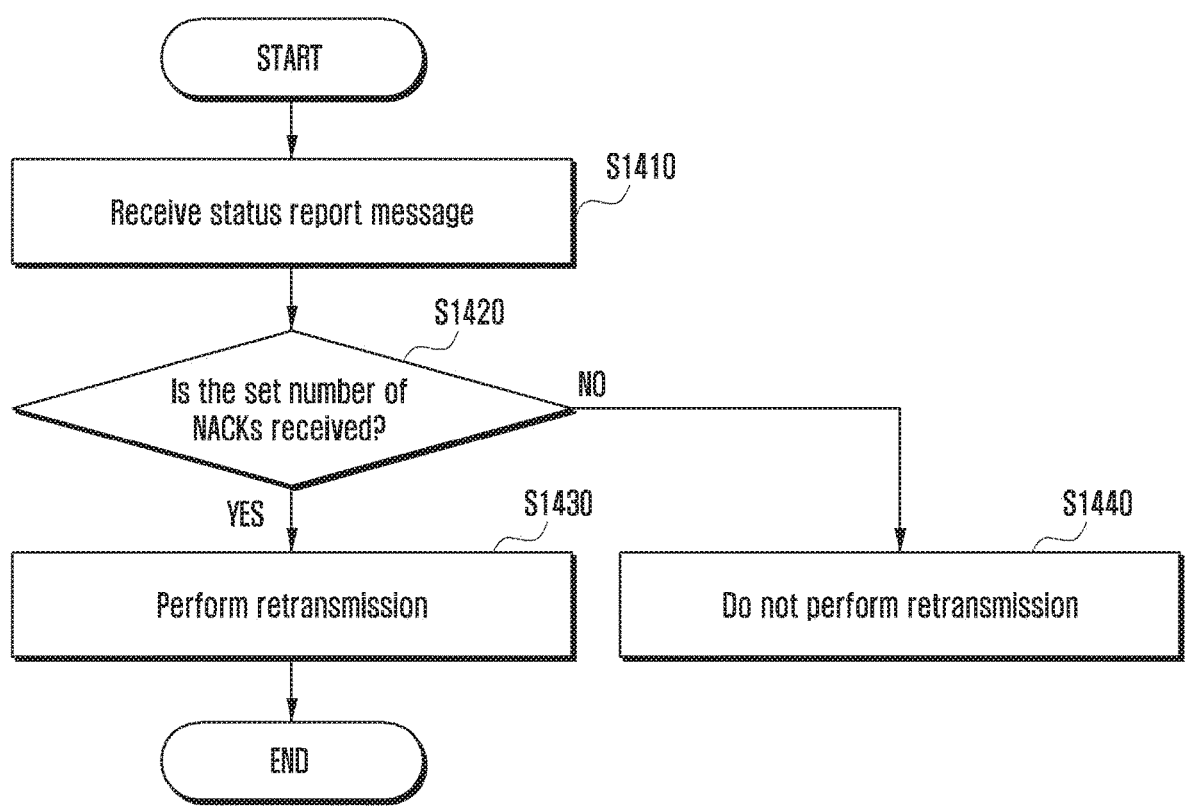
FIG. 14 is a flow chart illustrating the method of retransmitting a packet described in FIG. 12 according to an embodiment of the present disclosure.

FIG. 14 is a flow chart illustrating the method of retransmitting a packet described in FIG. 12 according to an embodiment of the present disclosure.

Referring to FIG. 14, a method of retransmitting a packet based on the preset number of NACKs as illustrated in FIG. 12.

The transmitter may receive the status report message from the receiver in operation S1410. The status report message may include the information on the packet received by the receiver.

In operation S1420, the transmitter may determine whether the number of NACKs for the non-received packet reaches the set number. That is, the transmitter may identify whether or not the reception frequency of the NACK reception for the non-received packet satisfies the set frequency.

If the reception frequency of the NACK for the non-received packet is satisfied, the transmitter may perform the retransmission in operation S1430. The transmitter may retransmit the non-received packet to the receiver.

Meanwhile, if the reception frequency of the NACK for the non-received packet is less than the set frequency, the transmitter may not perform the retransmission in operation S1440.

Figure 15:
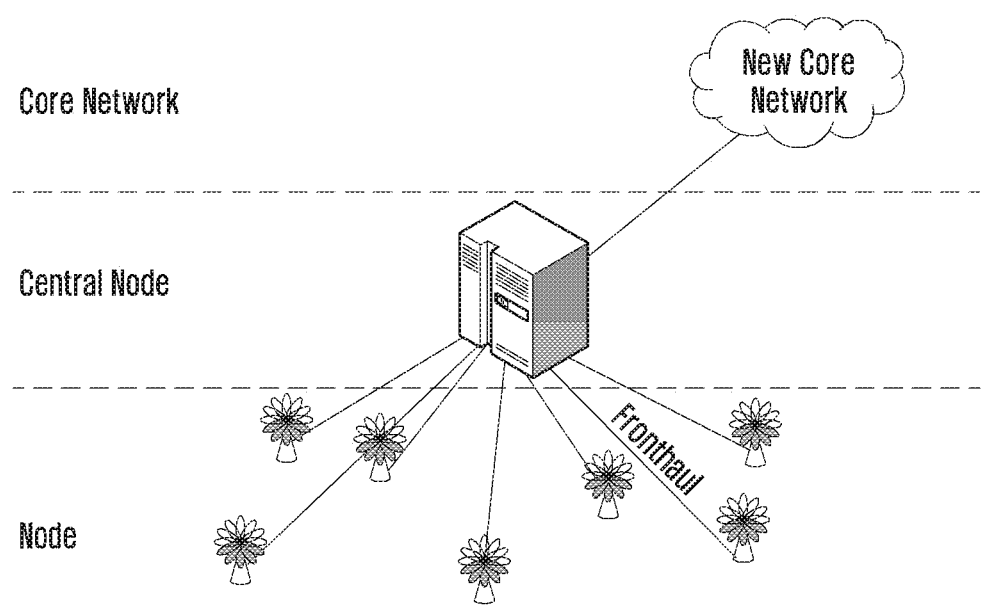
FIG. 15 is a diagram illustrating a network structure to which the present disclosure is applicable according to an embodiment of the present disclosure.

FIG. 15 is a diagram illustrating a network structure to which the present disclosure is applicable according to an embodiment of the present disclosure.

Referring to FIG. 15, a function of a base station may be distributed to a central node and a node according to an implementation method of a communication system. Describing the dual connectivity scheme of the LTE by way of example, the RRC and PDCP layers of the LTE protocol stack may be implemented in a central node, and the RLC, MAC, and PHY layers may be implemented in Node. In another embodiment, according to the implementation scheme, sequence numbering and ARQ among the RRC, PDCP, and RLC functions are implemented in the central node, segmentation among the RLC functions and the MAC and PHY layers may be implemented in the Node. According to an embodiment, the Central Node may be called a central unit (CU), an access point (AP), a data center, or the like. According to an embodiment, the Node may be referred to as a distributed unit (DU), an access unit (AU), a small base station (BS), or the like. Typically, a wired connection between the central node and the Node is called a front haul (Fronthaul). The front haul may be called various names such as X2 interface and Xn interface according to the embodiment.

The present disclosure may be applied when a SN is allocated in a central node and the SN is used in a node.

Figure 16:
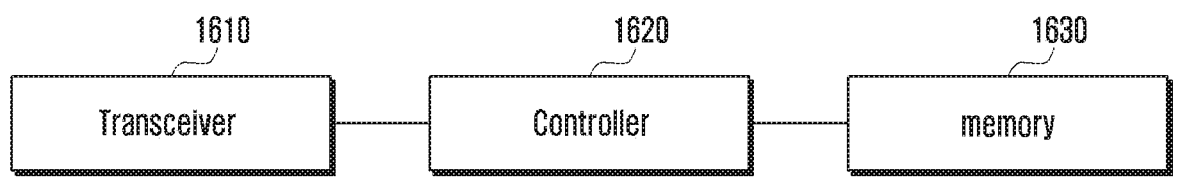
FIG. 16 is a diagram illustrating a structure of a terminal according to an embodiment of the present embodiment.

FIG. 16 is a diagram illustrating a structure of a terminal according to an embodiment of the present disclosure.

Referring to FIG. 16, the terminal may include a transceiver 1610, a controller 1620, and a memory 1630. For The controller may be a circuit, an application-specific integrated circuit or at least one processor.

The transceiver 1610 may transmit or receive a signal to or from the base station, and may include an interface unit for it. For example, the transceiver 1610 may receive configuration information, packets, and the like from the base station and may transmit the status report message.

The controller 1620 may control the operation of the terminal and may control the terminal to perform the operations described in the embodiment. Also, the controller 1620 may include at least one processor. Further, the processor may be controlled by a program including instructions that execute the methods described in the embodiments of the present specification. Further, the program may be stored in a storage medium, and the storage medium may include a volatile or non-volatile memory. The memory may be a medium capable of storing data, and the form thereof is not limited as long as it stores the instructions.

As described above, the present disclosure describes, by way of example, the downlink transmission but may be identically operated even in the case of the uplink transmission, and therefore the controller 1620 may perform the operation described as the operation of the base station.

The memory 1630 may store at least one of information transmitted/received through the transceiver. Further, the memory 1630 may store at least one of the information generated by the controller 1620

Further, as described above, the terminal may be operated as the receiver in the downlink transmission and as the transmitter in the uplink transmission.

Figure 17:
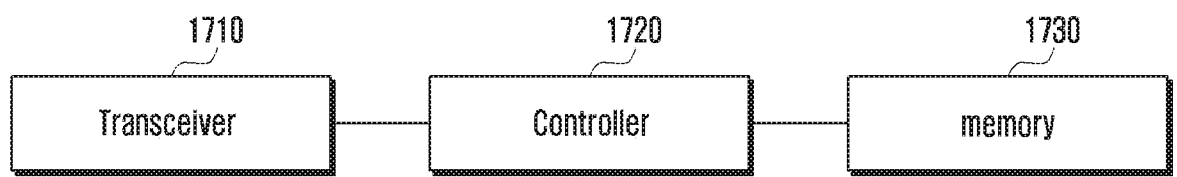
FIG. 17 is a diagram illustrating a configuration of a base station according to an embodiment of the present embodiment.

FIG. 17 is a diagram illustrating a configuration of a base station according to an embodiment of the present disclosure.

Referring to FIG. 17, the terminal may include a transceiver 1710, a controller 1720, and a memory 1730. The controller may be a circuit, an application-specific integrated circuit or at least one processor.

The transceiver 1710 may transmit or receive a signal to or from the terminal, and may include an interface unit for it. For example, the transceiver 1710 may transmit the configuration information, the packets, and the like to the terminal and may receive the status report information from the terminal.

The controller 1720 may control the operation of the base station and may control the base station to perform the operations described in the embodiment. Also, the controller 1720 may include at least one processor. Further, the processor may be controlled by a program including instructions that execute the methods described in the embodiments of the present specification. Further, the program may be stored in a storage medium, and the storage medium may include a volatile or non-volatile memory. The memory may be a medium capable of storing data, and the form thereof is not limited as long as it stores the instructions.

As described above, the present disclosure describes, by way of example, the downlink transmission but may be identically operated even in the case of the uplink transmission, and therefore the controller 1720 may perform the operation described as the operation of the terminal.

The memory 1730 may store at least one of information transmitted/received through the transceiver. Further, the memory 1730 may store at least one of the information generated by the controller 1720.

Further, as described above, the base station may be operated as the transmitter in the downlink transmission and as the receiver in the uplink transmission.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a receiver in a wireless communication system, the method comprising:
    identifying whether a sequence number of a second received packet is discontinuous based on a sequence number of a first received packet;
    starting a reordering timer in case that the sequence number of the second received packet is discontinuous;
    receiving, from a transmitter, a control message including information on a plurality of packets transmitted from the transmitter, wherein the information on the plurality of the packets includes a sequence number of a last transmitted packet and a bitmap indicating packets transmitted before the last transmitted packet;
    identifying at least one not received packet among the plurality of the packets based on the control message; and
    transmitting, to the transmitter, a status report message including a sequence number of the at least one not received packet in case that the reordering timer expires.

2. The method of claim 1, wherein the status report message further includes the sequence number of the second received packet.

3. The method of claim 1, wherein the control message is received based on at least one of period information, data size information, or packet number information.

4. The method of claim 1, wherein the transmitting of the status report message further comprises determining packets not transmitted from the transmitter as received packets based on the control message.

5. A receiver in a wireless communication system, the receiver comprising:
    a transceiver; and
    at least one processor coupled with the transceiver and configured to:
        identify whether a sequence number of a second received packet is discontinuous based on a sequence number of a first received packet,
        start a reordering timer in case that the sequence number of the second received packet is discontinuous,
        receive, from a transmitter, a control message including information on a plurality of packets transmitted from the transmitter, wherein the information on the plurality of the packets includes a sequence number of a last transmitted packet and a bitmap indicating packets transmitted before the last transmitted packet,
        identify at least one not received packet among the plurality of the packets based on the control message, and
        transmit, to the transmitter, a status report message including a sequence number of the at least one not received packet in case that the reordering timer expires.

6. The receiver of claim 5, wherein the status report message further includes the sequence number of the second received packet.

7. The receiver of claim 5, wherein the control message is received based on at least one of period information, data size information, or packet number information.

8. The receiver of claim 5, wherein the at least one processor is further configured to determine packets not transmitted from the transmitter as received packets based on the control message.

* * * * *